US012745161B2

(12) United States Patent
Islam et al.

(10) Patent No.: US 12,745,161 B2
(45) Date of Patent: Sep. 22, 2026

(54) TECHNIQUES FOR PAUSING SMALL DATA TRANSMISSIONS

(71) Applicant: QUALCOMM Incorporated, San Diego, CA (US)

(72) Inventors: Muhammad Nazmul Islam, Littleton, MA (US); Jing Lei, San Diego, CA (US); Chun-Hao Hsu, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 238 days.

(21) Appl. No.: 18/466,740

(22) Filed: Sep. 13, 2023

(65) Prior Publication Data

US 2024/0244510 A1 Jul. 18, 2024

Related U.S. Application Data

(60) Provisional application No. 63/480,283, filed on Jan. 17, 2023.

(51) Int. Cl.
*H04W 48/12* (2009.01)
*H04L 5/00* (2006.01)
*H04W 48/14* (2009.01)

(52) U.S. Cl.
CPC ........... *H04W 48/14* (2013.01); *H04L 5/0005* (2013.01); *H04L 5/0051* (2013.01); *H04L 5/0053* (2013.01); *H04L 5/0092* (2013.01)

(58) Field of Classification Search
CPC .... H04W 48/14; H04L 5/0005; H04L 5/0051; H04L 5/0053
See application file for complete search history.

(56) References Cited

U.S. PATENT DOCUMENTS

2022/0046498 A1* 2/2022 Cheng .................. H04B 7/1851
2022/0408403 A1* 12/2022 Tseng .................... H04W 76/27
(Continued)

FOREIGN PATENT DOCUMENTS

WO 2022083866 A1 4/2022
WO WO-2022268173 A1 12/2022
WO WO-2023275028 A2 * 1/2023 ............ H04W 64/00

OTHER PUBLICATIONS

3GPP TSG-RAN WG2#114e, R2-2105574 Title:Small data transmission with RA-based schemes (Year: 2021).*
(Continued)

*Primary Examiner* — Faruk Hamza
*Assistant Examiner* — Abusayeed M Haque
(74) *Attorney, Agent, or Firm* — Holland & Hart LLP

(57) ABSTRACT

Methods, systems, and devices for wireless communication are described. A user equipment (UE) may pause, while operating in an inactive mode, the performance of one or more small data transmissions (SDTs) in an initial bandwidth part (BWP) in order to monitor for a first set of reference signals in a default BWP. The UE may pause the performance of the one or more SDTs in the first BWP periodically, semi-statically, in accordance with a network trigger, in accordance with the capabilities of the UE, or a combination thereof. The UE may monitor the second BWP for the first set of reference signals, receive the first set of reference signals in accordance with the monitoring, and measure the first set of reference signals. In accordance with the measuring the first set of reference signals, the UE may resume the performance of the one or more SDTs in the first BWP.

30 Claims, 23 Drawing Sheets

(56) References Cited

U.S. PATENT DOCUMENTS

| | | | | |
|---|---|---|---|---|
| 2023/0345508 | A1* | 10/2023 | Lei | H04W 72/0453 |
| 2024/0040626 | A1* | 2/2024 | Tseng | H04W 72/542 |
| 2024/0349347 | A1* | 10/2024 | Zhang | H04W 74/006 |

OTHER PUBLICATIONS

3GPP TSG-RAN WG1#106bis-e, R1-2109466 Title: MOderator summary for multi-beam enhancement (Year: 2021).*
International Search Report and Written Opinion—PCT/US2023/085803—ISA/EPO—May 22, 2024.
Partial International Search Report—PCT/US2023/085803—ISA/EPO—Apr. 3, 2024.
Qualcomm Incorporated: "Remaining Issues on Procedures of RedCap UE", 3GPP TSG RAN WG1 Meeting #111, R1-2212086, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 5, 2022, 5 Pages, XP052222650, 1. Background, Figure 1, 5. Conclusion, 2. Clarification for Random Access Procedure of RedCap UE, paragraph [0004].

* cited by examiner

TECHNIQUES FOR PAUSING SMALL DATA TRANSMISSIONS

CROSS REFERENCE

The present Application for Patent claims the benefit of U.S. Provisional Patent Application No. 63/480,283 by ISLAM et al., entitled "TECHNIQUES FOR PAUSING SMALL DATA TRANSMISSIONS," filed Jan. 17, 2023, assigned to the assignee hereof, and expressly incorporated by reference herein.

FIELD OF TECHNOLOGY

The following relates to wireless communications, including techniques for pausing small data transmissions (SDT).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for pausing small data transmissions (SDTs). For example, the described techniques provide for a user equipment (UE) to pause, while operating in an inactive mode, the performance of one or more SDTs in an initial bandwidth part (BWP) in order to monitor for a first set of reference signals in a default BWP. The UE may pause the performance of the one or more SDTs in the first BWP periodically, semi-statically, in accordance with a network trigger, in accordance with the capabilities of the UE, or a combination thereof. The UE may monitor the second BWP for the first set of reference signals, receive the first set of reference signals in accordance with the monitoring, and measure the first set of reference signals in accordance with pausing the SDTs. In accordance with the measuring the first set of reference signals, the UE may resume the performance of the one or more SDTs in the first BWP.

A method for wireless communications at a UE is described. The method may include transmitting, in an inactive mode, one or more SDTs via a first BWP, pausing the transmission of the one or more SDTs in the first BWP to monitor a second BWP for a first set of reference signals in the inactive mode, measuring the first set of reference signals in accordance with monitoring the second BWP in the inactive mode, and resuming the transmission of the one or more SDTs in the first BWP in the inactive mode after measuring the first set of reference signals.

A UE is described. The UE may include one or more memories storing processor-executable code, one or more processors coupled with the one or more memories and individually or collectively operable to execute the code to cause the UE to transmit, in an inactive mode, one or more SDTs via a first BWP, pause the transmission of the one or more SDTs in the first BWP to monitor a second BWP for a first set of reference signals in the inactive mode, measure the first set of reference signals in accordance with monitoring the second BWP in the inactive mode, and resume the transmission of the one or more SDTs in the first BWP in the inactive mode after measuring the first set of reference signals.

Another UE is described. The apparatus may include means for transmitting, in an inactive mode, one or more SDTs via a first BWP, means for pausing the transmission of the one or more SDTs in the first BWP to monitor a second BWP for a first set of reference signals in the inactive mode, means for measuring the first set of reference signals in accordance with monitoring the second BWP in the inactive mode, and means for resuming the transmission of the one or more SDTs in the first BWP in the inactive mode after measuring the first set of reference signals.

A non-transitory computer-readable medium storing code for wireless communications at a UE is described. The code may include instructions executable by one or more processors to transmit, in an inactive mode, one or more SDTs via a first BWP, pause the transmission of the one or more SDTs in the first BWP to monitor a second BWP for a first set of reference signals in the inactive mode, measure the first set of reference signals in accordance with monitoring the second BWP in the inactive mode, and resume the transmission of the one or more SDTs in the first BWP in the inactive mode after measuring the first set of reference signals.

Some examples of the method, apparatuses, and non-transitory computer-readable medium described herein may further include operations, features, means, or instructions for receiving an indication of a length of a measurement gap for measuring the first set of reference signals and a periodicity of the measurement gap, where pausing the transmission of the one or more SDTs occurs during the measurement gap.

Some examples of the method, apparatuses, and non-transitory computer-readable medium described herein may further include operations, features, means, or instructions for pausing the transmission of the one or more SDTs may be associated with a discontinuous reception cycle of the UE.

Some examples of the method, apparatuses, and non-transitory computer-readable medium described herein may further include operations, features, means, or instructions for pausing the transmission of the one or more SDTs occurs for a duration of time, the duration of time being in accordance with a measurement time for measuring the first set of reference signals and a fixed value.

Some examples of the method, apparatuses, and non-transitory computer-readable medium described herein may further include operations, features, means, or instructions for pausing the transmission of the one or more SDTs occurs during a time frame that includes a transmission of the first set of reference signals and a paging occasion of the UE.

Some examples of the method, apparatuses, and non-transitory computer-readable medium described herein may further include operations, features, means, or instructions for receiving, via the first BWP, an indication to measure the first set of reference signals, where pausing the transmission of the one or more SDTs may be in accordance with the indication.

Some examples of the method, apparatuses, and non-transitory computer-readable medium described herein may further include operations, features, means, or instructions for measuring a second set of reference signals in the first BWP, where the second set of reference signals may be associated with a serving cell.

Some examples of the method, apparatuses, and non-transitory computer-readable medium described herein may further include operations, features, means, or instructions for receiving a message indicating a degradation threshold, the degradation threshold being associated with the second set of reference signals.

Some examples of the method, apparatuses, and non-transitory computer-readable medium described herein may further include operations, features, means, or instructions for pausing the transmission of the one or more SDTs to monitor the second BWP for the first set of reference signals in accordance with measurements of the second set of reference signals satisfying the degradation threshold.

Some examples of the method, apparatuses, and non-transitory computer-readable medium described herein may further include operations, features, means, or instructions for monitoring for the first set of reference signals in the first BWP in accordance with measurements of the second set of reference signals satisfying the degradation threshold.

In some examples of the method, apparatuses, and non-transitory computer-readable medium described herein, the message may be one of a system information message, a medium access control-control element (MAC-CE) message, or a downlink control information (DCI) message.

Some examples of the method, apparatuses, and non-transitory computer-readable medium described herein may further include operations, features, means, or instructions for transmitting a measurement report indicating measurements of the second set of reference signals and receiving, via the first BWP, an indication to measure the first set of reference signals in accordance with the measurement report, where pausing the transmission of the one or more SDTs may be in accordance with the indication.

In some examples of the method, apparatuses, and non-transitory computer-readable medium described herein, the first set of reference signals include one or more of cell defining synchronization signal blocks (CD-SSBs) and the second set of reference signals include one or more of non-CD-SSBs (NCD-SSBs), tracking reference signals (TRSs), or a combination thereof.

Some examples of the method, apparatuses, and non-transitory computer-readable medium described herein may further include operations, features, means, or instructions for transmitting a capability message indicating a capability of the UE to operate in the first BWP without receiving the first set of reference signals and one or more resources associated with the second BWP, where pausing the transmission of the one or more SDTs may be in accordance with the capability of the UE.

In some examples of the method, apparatuses, and non-transitory computer-readable medium described herein, the UE may be a reduced capability UE.

A method for wireless communications at a UE is described. The method may include transmitting, in an inactive mode, one or more SDTs via a first BWP, receiving, in the inactive mode, a message including an indication of updated system information via the first BWP, and receiving, in the inactive mode, the updated system information in accordance with the message including the indication of the updated system information.

A UE is described. The UE may include one or more memories storing processor-executable code, one or more processors coupled with the one or more memories and individually or collectively operable to execute the code to cause the UE to transmit, in an inactive mode, one or more SDTs via a first BWP, receive, in the inactive mode, a message including an indication of updated system information via the first BWP, and receive, in the inactive mode, the updated system information in accordance with the message including the indication of the updated system information.

Another UE is described. The UE may include means for transmitting, in an inactive mode, one or more SDTs via a first BWP, means for receiving, in the inactive mode, a message including an indication of updated system information via the first BWP, and means for receiving, in the inactive mode, the updated system information in accordance with the message including the indication of the updated system information.

A non-transitory computer-readable medium storing code for wireless communications at a UE is described. The code may include instructions executable by one or more processors to transmit, in an inactive mode, one or more SDTs via a first BWP, receive, in the inactive mode, a message including an indication of updated system information via the first BWP, and receive, in the inactive mode, the updated system information in accordance with the message including the indication of the updated system information.

In some examples of the method, apparatuses, and non-transitory computer-readable medium described herein, the indication of the updated system information includes the updated system information.

Some examples of the method, apparatuses, and non-transitory computer-readable medium described herein may further include operations, features, means, or instructions for receiving, via the message, an indication to terminate the transmission of the one or more SDTs and monitoring a second BWP for the updated system information in accordance with the indication to terminate the transmission of the one or more SDTs.

In some examples of the method, apparatuses, and non-transitory computer-readable medium described herein, the second BWP includes one or more combinations of a CD-SSB, a core resource set (CORESET) indexed zero (CORESET0), a common CORESET for a serving cell, or a combination thereof.

In some examples of the method, apparatuses, and non-transitory computer-readable medium described herein, the message may be one of a radio resource control (RRC) message, a MAC-CE, or a DCI message.

A method is described. The method may include receiving, from a UE operating in an inactive mode, one or more SDTs via a first BWP, pausing the transmission of the one or more SDTs in the first BWP for a duration of time, transmitting a first set of reference signals via a second BWP while pausing the transmission of the one or more SDTs in the first BWP, and resuming the transmission of the one or more SDTs in the first BWP after transmitting the first set of reference signals.

A network entity is described. The network entity may include one or more memories storing processor-executable code and one or more processors coupled with the one or more memories and individually or collectively operable to execute the code to cause the network entity to receive, from a UE operating in an inactive mode, one or more SDTs via a first BWP, pause the transmission of the one or more SDTs in the first BWP for a duration of time, transmit a first set of reference signals via a second BWP while pausing the transmission of the one or more SDTs in the first BWP, and resume the transmission of the one or more SDTs in the first BWP after transmitting the first set of reference signals.

Another network entity is described. The network entity may include means for receiving, from a UE operating in an inactive mode, one or more SDTs via a first BWP, means for pausing the transmission of the one or more SDTs in the first BWP for a duration of time, means for transmitting a first set of reference signals via a second BWP while pausing the transmission of the one or more SDTs in the first BWP, and means for resuming the transmission of the one or more SDTs in the first BWP after transmitting the first set of reference signals.

A non-transitory computer-readable medium storing code at a network entity is described. The code may include instructions executable by one or more processors to receive, from a UE operating in an inactive mode, one or more SDTs via a first BWP, pause the transmission of the one or more SDTs in the first BWP for a duration of time, transmit a first set of reference signals via a second BWP while pausing the transmission of the one or more SDTs in the first BWP, and resume the transmission of the one or more SDTs in the first BWP after transmitting the first set of reference signals.

Some examples of the method, apparatuses, and non-transitory computer-readable medium described herein may further include operations, features, means, or instructions for transmitting an indication of a length of a measurement gap for the UE to use in measuring the first set of reference signals and a periodicity of the measurement gap, where pausing the transmission of the one or more SDTs occurs during the measurement gap.

Some examples of the method, apparatuses, and non-transitory computer-readable medium described herein may further include operations, features, means, or instructions for pausing the transmission of the one or more SDTs may be associated with a discontinuous reception cycle of the UE.

In some examples of the method, apparatuses, and non-transitory computer-readable medium described herein, the duration of time may be in accordance with a measurement time of the UE for measuring the first set of reference signals and a fixed value.

Some examples of the method, apparatuses, and non-transitory computer-readable medium described herein may further include operations, features, means, or instructions for pausing the transmission of the one or more SDTs occurs during a time frame that includes a transmission of the first set of reference signals and a paging occasion of the UE.

Some examples of the method, apparatuses, and non-transitory computer-readable medium described herein may further include operations, features, means, or instructions for transmitting, via the first BWP, an indication for the UE to measure the first set of reference signals, where pausing the transmission of the one or more SDTs may be in accordance with the indication.

Some examples of the method, apparatuses, and non-transitory computer-readable medium described herein may further include operations, features, means, or instructions for transmitting a second set of reference signals in the first BWP, where the second set of reference signals may be associated with a serving cell.

Some examples of the method, apparatuses, and non-transitory computer-readable medium described herein may further include operations, features, means, or instructions for transmitting a message indicating a degradation threshold, the degradation threshold being associated with the second set of reference signals.

In some examples of the method, apparatuses, and non-transitory computer-readable medium described herein, the message may be one of a system information message, a MAC-CE, or a DCI message.

Some examples of the method, apparatuses, and non-transitory computer-readable medium described herein may further include operations, features, means, or instructions for receiving a measurement report indicating measurements of the second set of reference signals and transmitting an indication to measure the first set of reference signals in accordance with the measurement report, where pausing the transmission of the one or more SDT's may be in accordance with the indication.

In some examples of the method, apparatuses, and non-transitory computer-readable medium described herein, the first set of reference signals include one or more CD-SSBs and the second set of reference signals include one or more NCD-SSBs, one or more TRSs, or a combination thereof.

Some examples of the method, apparatuses, and non-transitory computer-readable medium described herein may further include operations, features, means, or instructions for receiving a capability message indicating a capability of the UE to operate in the first BWP without receiving the first set of reference signals and one or more resources associated with the second BWP, where pausing the transmission of the one or more SDTs may be in accordance with the capability of the UE.

In some examples of the method, apparatuses, and non-transitory computer-readable medium described herein, the UE may be a reduced capability UE.

A method for wireless communications at a network entity is described. The method may include receiving, from a UE operating in an inactive mode, one or more SDTs via a first BWP, transmitting a message including an indication of updated system information via the first BWP, and transmitting the updated system information in accordance with the message including the indication of the updated system information.

A network entity is described. The network entity may include one or more memories storing processor-executable code and one or more processors coupled with the one or more memories and individually or collectively operable to execute the code to cause the network entity to receive, from a UE operating in an inactive mode, one or more SDTs via a first BWP, transmit a message including an indication of updated system information via the first BWP, and transmit the updated system information in accordance with the message including the indication of the updated system information.

Another network entity is described. The network entity may include means for receiving, from a UE operating in an inactive mode, one or more SDTs via a first BWP, means for transmitting a message including an indication of updated system information via the first BWP, and means for transmitting the updated system information in accordance with the message including the indication of the updated system information.

A non-transitory computer-readable medium storing code for wireless communications at a network entity is described. The code may include instructions executable by one or more processors to receive, from a UE operating in an inactive mode, one or more SDTs via a first BWP, transmit a message including an indication of updated system information via the first BWP, and transmit the updated system information in accordance with the message including the indication of the updated system information.

In some examples of the method, apparatuses, and non-transitory computer-readable medium described herein, the indication of the updated system information includes the updated system information.

Some examples of the method, apparatuses, and non-transitory computer-readable medium described herein may further include operations, features, means, or instructions for transmitting, via the message, an indication to terminate the transmission of the one or more SDTs and transmitting, via a second BWP, the updated system information in accordance with the indication to terminate the transmission of the one or more SDTs.

In some examples of the method, apparatuses, and non-transitory computer-readable medium described herein, the second BWP includes one or more combinations of a CD-SSB, a CORESET0, a common CORESET for a serving cell, or a combination, thereof.

In some examples of the method, apparatuses, and non-transitory computer-readable medium described herein, the message may be one of a RRC message, a MAC-CE, or a DCI message.

DETAILED DESCRIPTION

Figure 1:
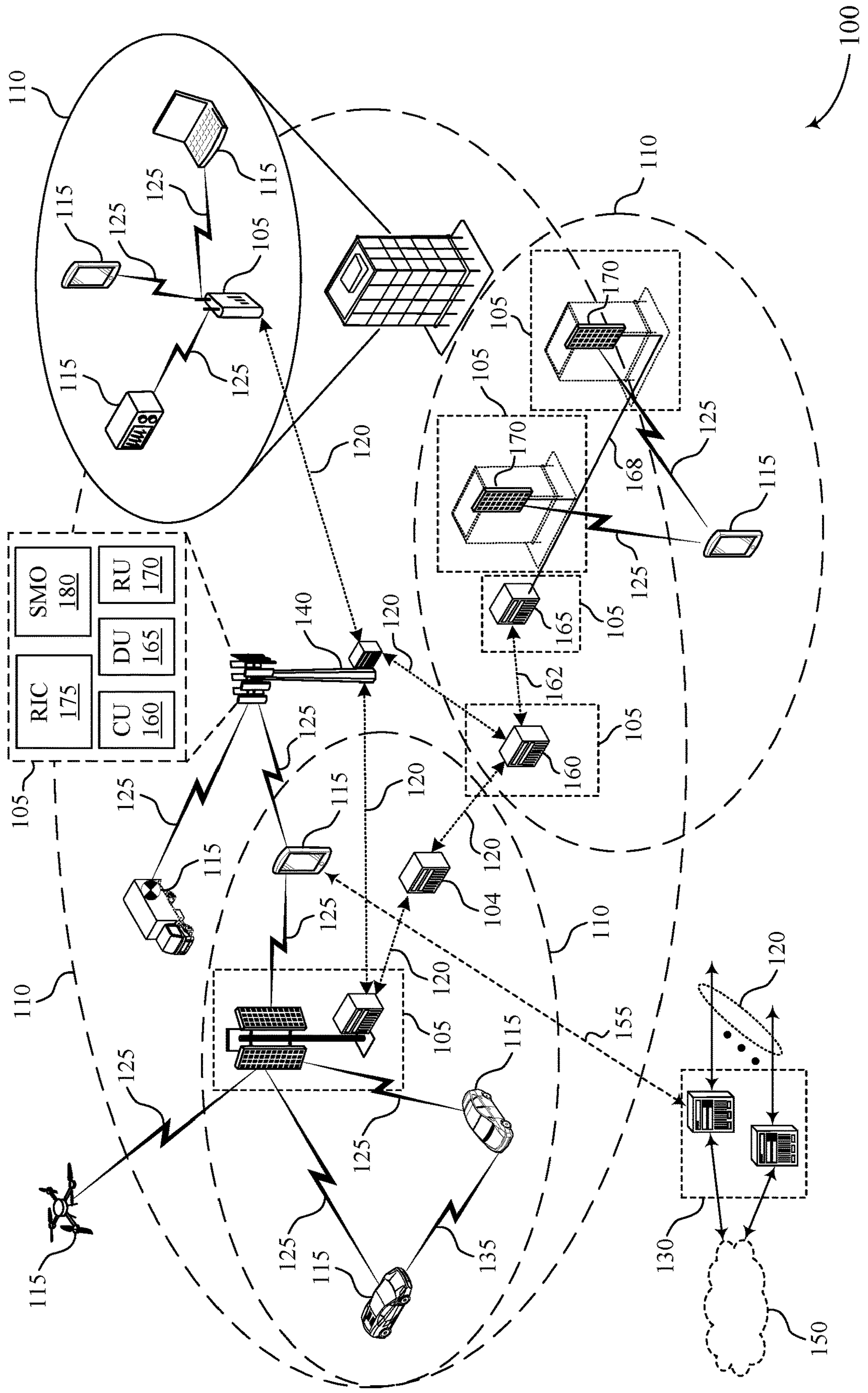
FIG. 1 illustrates an example of a wireless communications system that supports techniques for pausing small data transmissions (SDTs) in accordance with one or more aspects of the present disclosure.

In some wireless communications systems, a user equipment (UE) (e.g., such as a reduced capability UE) may perform one or more small data transmissions (SDTs) while in an inactive state (e.g., radio resource control (RRC) inactive state (RRC_INACTIVE)). For example, the UE may receive, while operating in an active state, an RRC release message indicating for the UE to release the current RRC connection. The RRC release message may also include an initial bandwidth part (BWP), such that the UE may perform SDTs via the initial BWP while operating in the inactive mode. During the performance of the SDTs, the UE may receive one or more non-cell defining (NCD) synchronization signal blocks (SSBs) (NCD-SSBs) or tracking reference signals (TRSs) from the network entity via the initial BWP. The UE may measure the respective signals and report such measurements to the network entity.

In some cases, while in the inactive state and during SDT, the UE may perform cell selection or reselection, such that when the UE resumes an active state the UE may communicate with the network via the selected cell. In order to perform cell selection or reselection, the UE may monitor for cell defining (CD) SSBs (CD-SSBs) in a default BWP (e.g., a BWP used in activate state communications). However, during SDTs in an inactive state, the UE may not be able to monitor both the initial BWP and the default BWP at the same time. Further, there may not be mechanisms in place to allow the UE to monitor the default BWP and receive the CD-SSBs during SDTs, thereby causing delays in cell selection or reselection. Additionally, in some cases, the network entity may transmit, via the default BWP, updated system information while the UE is performing one or more SDTs. However, if the UE is unable to operate in both the initial BWP and default BWP at the same time, the UE may not be able to receive the updated system information, thereby decreasing reliability in the wireless communications system.

The techniques described herein may enable the UE to pause (e.g., interrupt) the SDTs in order to monitor the default BWP and receive the CD-SSBs, receive updated system information, or both. In some examples, the UE may interrupt the SDTs and perform CD-SSB measurement according to a configured periodicity. For example, the UE may receive, from the network entity, a measurement gap configuration that indicates both a duration of a measurement gap and a periodicity of such measurement gap. As such, during the measurement gap, the UE may interrupt the SDT being performed in the initial BWP, monitor the default BWP for the CD-SSBs, and perform CD-SSB measurements. In some other examples, the UE may perform semi-static CD-SSB measurements and interruptions based on the measurements of NCD-SSB in the initial BWP. For example, during SDTs, the UE may receive one or more NCD-SSBs and perform measurements on the NCD-SSBs. As such, if the measurements of the NCD-SSBs (e.g., quality of the reference signals) are below a degradation threshold (e.g., meaning the quality of the NCD-SSBs has degraded past a threshold point), the UE may interrupt the SDT and perform CD-SSB measurements in the default BWP, perform measurements on CD-SSBs within the initial BWP, or a combination thereof.

In some other examples, the network entity may trigger the UE to interrupt the SDTs and perform CB-SSB measurements. For example, while the UE is performing the SDTs, the network entity may transmit an indication via the initial BWP for the UE to switch to the default BWP and measure the CD-SSBs. In this way, the UE may pause the SDTs in order to monitor the default BWP, receive the CD-SSBS, and measure the CD-SSBs, thereby enabling the UE to perform cell selection or reselection during SDTs.

Further, the techniques described herein may enable a network entity to transmit updated system information during SDTs. In one example, the network entity may transmit an RRC message indicating the updated system information to the UE via the initial BWP. In another example, the network entity may transmit a message indicating for the UE to terminate (e.g., abort) the SDTs and monitor the default BWP in order to receive the system information.

Aspects of the disclosure are initially described in the context of wireless communications systems. Aspects of the disclosure are further illustrated in the context of process flows. Aspects of the disclosure are further illustrated by and described with reference to apparatus diagrams, system diagrams, and flowcharts that relate to techniques for pausing SDTs.

FIG. 1 illustrates an example of a wireless communications system 100 that supports techniques for pausing SDTs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for pausing SDTs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases of the wireless communications system 100, a network entity 105 may communicate with a reduced capability UE 115 (e.g., such as a wearable device, smart watch, or other device that may support some capabilities of an NR system). As such, the network entity 105 may configure a UE 115 with an initial BWP (e.g., RedCap initial BWP), where in the initial BWP, the network entity may not transmit CD-SSBs. Further, the UE may be configured, by the network entity, to transmit small data (e.g., perform SDTs) via the initial BWP. SDTs, and associated signaling, may refer to a defined or standardized classification of signaling and procedures used to transmit defined small quantities of data (e.g., without entering a RRC Connected state).

Additionally, the network entity 105 may transmit, to the UE 115, one or more NCD-SSBs or TRSs (e.g., to be used for tracking) via the initial BWP. However, during SDTs via the initial BWP, the UE 115 may have to monitor a default BWP for CD-SSBs for cell selection or reselection. As such, one or more interruption rules may be defined in order to control the interruption opportunity of the UE 115. Further, the UE 115 may not be able to obtain system information, located in default BWP (e.g., default initial downlink BWP), while performing SDT in initial BWP, due to the inability of the UE 115 to monitor both the default BWP and initial BWP in the same instance.

The UE 115 (e.g., reduced capability UE) may have a limited set of features or operational capabilities. For example, in frequency range 1 (FR1), the maximum FR1 bandwidth may be 20 MHz, while in frequency range 2 (FR2), the maximum FR2 bandwidth may be 100 MHz. Further, the UE 115 may signal an early indication of the reduced capabilities in message 1 of a 4 step random access channel (RACH) procedure. Further, the UE 115 may have a separate initial uplink BWP, where the UE 115 may transmit, via the initial uplink BWP, configurations used by the UE 115 to perform random access procedures, indications of whether frequency hopping for common physical uplink control channel (PUCCH) resources are enabled or disabled, or a combination thereof. As such, the UE 115 may be configured with a separate initial downlink BWP, where the UE 115 may receive, via the initial downlink BWP, a common search space (CSS) and control resource set zero (CORSET0) indication for random access.

In some examples, if a separate initial downlink BWP is configured for paging occasions, the UE 115 may receive CD-SSBs via the initial downlink BWP. In some examples, if a separate initial downlink BWP is configured for RACH, receiving an SSB may be optional (e.g., SSB may or may not be included in the initial downlink BWP). In some examples, if a separate initial downlink BWP is used in connected mode as BWP #0 (e.g., used in RRC_CONNECTED mode), then the UE 115 may receive the CD-SSB. Further, the UE 115 may have a single UE-specific RRC configured downlink BWP per carrier and a single UE-specific RRC configured uplink BWP per carrier. Additionally, the UE 115 may receive RRC reconfigurations of any parameters related to a BWP. In some examples, a UE-specific RRC configured downlink BWP may include CD-SSB or NCD-SSB. In such examples, the UE 115 may indicate whether the UE supports receiving CD-SSBs or NCD-SSBs via capability signaling. In some examples, the UE 115 may perform measurements using the NCD-SSB in the RRC-configured downlink BWP. If the UE 115 does not support both CD-SSB and NCD-SSB in the initial downlink BWP (e.g., RRC-configured downlink BWP without CD-SSB or NCD-SSB0, the UE 115 may indicate such capabilities via capability messages.

In some cases, the UE 115, operating in an active or connected mode (e.g., RRC_CONNECTED) mode, may be configured with a measurement gap configuration. The measurement gap configuration may include a gap offset (e.g., gapOffset) a gap pattern identification (ID), a measurement gap length (MGL) (e.g., represented in units of milliseconds (ms)), a measurement gap repetition period (MGRP) (e.g., represented in units of ms), or a combination thereof. The gap offset may contain a value of the gap pattern with the MGRP, where the gap offset value range is from zero to MGRP-1. The MGL may be a measurement of the gap length in ms of the measurement gap. If the parameter ncsglnd-r17 is not present in the measurement gap configuration, then the measurement gap length may be determined according to a preconfigured table in the UE 115 (e.g., set by the 3GPP standards). The MGRP value is a measurement gap repetition period in ms of the measurement gap and may be set in accordance with the preconfigured table in the UE 115.

The UE 115 may use such measurement gap in order to measure SSBs while operating in the active or connected mode to perform cell selection or reselection. To perform cell selection or reselection, the UE 115 may measure the synchronization signal reference signal received power (SS-RSRP) and synchronization signal reference signal received quality (SS-RSRQ) levels of the serving cell SSBs and evaluate the cell selection criterion (e.g., parameter S indicated in a 3GPP standards document) for the serving cell once every M1*N1 discontinuous reception (DRX) cycle, where M1 is equal to two if the SSB measurement timing configuration (SMTC) window periodicity is greater than 20 ms (e.g., $T_{SMTC}$>20 ms) and the DRX cycle is less than or equal to 0.64 seconds, otherwise M1 is equal to one. That is, the UE 115 may measure the SSBs of a serving cell in accordance with configured parameters, where such configuration may be received from the network, preconfigured at the UE 115, or a combination thereof (e.g., in accordance with the configured DRX cycle length, Scaling Factors (N1) for FR1 and FR2, and quantity of DRX cycles ($N_{serv}$) as specified in the 3GPP standards). Such parameters may apply to UEs 115 that support power classes 2, 3, and 4. If the UE 115 supports power class 1 or 5, the scaling factor (N1) may be equal to eight for all DRX cycle lengths. Further, if the UE 115 has evaluated the SSBs of the serving in accordance with the configured parameters in $N_{serv}$ consecutive DRX cycles that the serving cells does not fulfill the cell selection criterion S, then the UE 115 may initiate the measurements of all neighbour cells indicated by the serving cell. That is, if the UE 115 evaluates one or more SSBs of the serving cell in accordance with the configured parameters (e.g., DRX cycle lengths, scaling factors, and $N_{serv}$) and the measurements do not satisfy the cell selection criterion S (e.g., a quality metric), then the UE 115 may perform one or more measurements of neighboring cells in order to perform cell selection.

To perform intra-frequency and inter-frequency neighbor cell measurements, the UE 115 may be configured with one or more parameters (e.g., as defined in the 3GPP standards). Such parameters for intra-frequencies may include DRX cycle lengths, Scaling Factors (N1) for FR1 and FR2, a periodicity to detect reference signals from neighboring cells in intra-frequencies (e.g., $T_{detect.NR\_Intra}$ represented in a quantity of DRX cycles), a periodicity of measurements in intra-frequencies (e.g., $T_{measurement.NR\_Intra}$ represented in a quantity of DRX cycles), and a periodicity for evaluation (e.g., $T_{evaluate.NR\_Intra}$ represented in a quantity of DRX cycles). Such parameters may apply to UEs 115 that support power classes 2, 3, and 4. If the UE 115 supports power class 1 or 5, the scaling factor (N1) may be equal to eight for all DRX cycle lengths. Further, the UE 115 may set the parameter M2 to be 1.5, if the SMTC periodicity of measured intra-frequency cell is greater than 20 ms, otherwise M2=1. Additionally, if different SMTC periodicities are configured for different cells, the SMTC periodicity may be used by the cell being identified. During primary synchronization signal (PSS) or secondary synchronization signal (SSS) detection, the UE 115 may assume the periodicity of the SMTC for the intra-frequency carrier, and if the actual SSB transmission periodicity is greater than the SMTC configured for the intra-frequency carrier, the UE 115 may expect a longer $T_{detect.NR\_Intra}$.

Such parameters for inter-frequencies may include DRX cycle lengths, Scaling Factors (N1) for FR1 and FR2, a periodicity to detect SSBs from neighboring cells in inter-frequencies (e.g., $T_{detect.NR\_Inter}$ represented in a quantity of DRX cycles), a periodicity of measurements in inter-frequencies (e.g., $T_{measurement.NR\_Inter}$ represented in a quantity of DRX cycles), and a periodicity for evaluation (e.g., $T_{evaluate.NR\_Intrer}$ represented in a quantity of DRX cycles). Such parameters may apply to UEs 115 that support power classes 2, 3, and 4. If the UE 115 supports power class 1 or 5, the scaling factor (N1) may be equal to eight for all DRX cycle lengths.

In some cases, the UE 115 (e.g., reduced capability UE 115) may receive an RRC release message indicating for the UE 115 to release the current RRC connection with the network. As such, the network entity 105 may enable the UE 115 to transmit a relatively small amount of data (e.g., relative to active communications) via an uplink channel while operating in the inactive state (e.g., RRC_INACTIVE) without having to move to a connected state (e.g., RRC_CONNECTED). That is, the network entity 105 may enable the UE 115 to perform one or more mobile originated (MO) SDTs in RRC_INACTIVE mode (e.g., data originates from UE 115 and is sent to the network entity 105). In order to facilitate SDT communications, the UE 115 may perform a RACH based SDT procedures (e.g., 2-step and 4-step RACH procedures). Alternatively, the UE 115 may perform a configured grant (CG) SDT procedure, where the UE 115 transmits uplink data on a pre-configured physical uplink shared channel (PUSCH) resources (e.g., reusing the CG type 1 resources). In either procedure (e.g., RACH based or CG based), the network entity 105 may control the subsequent transmission of small amounts of data (e.g., SDTs) in the uplink and downlink channels with the UE 115 operating in an inactive mode.

Further, the network entity 105 may enable a non-access Spectrum (NAS) message delivery within SDTs. As such, the network entity 105 may configure the UE 115 with signaling radio bearer 1 (SRB1) and signaling radio bearer 2 (SRB2) for small data transmission in RRC_INACTIVE modes (i.e., transfer NAS messages via SRB2). In some cases, SDT may be further enhanced with mobile terminated (MT) SDTs (e.g., network entity transmits small amounts of data to UEs 115, where the UEs 115 are operating in inactive mode). For example, support for paging-triggered SDT may be implemented to enhance SDTs. Additionally, the network entity 105 may implement MT-SDT triggering mechanisms for the UE 115 operating in inactive mode, where RACH based or CG based SDTs may be used as the uplink response. The UE 115 may also initiate MT-SDT procedures for initial downlink data reception and subsequent uplink and downlink data transmissions, while the UE is operating in an inactive mode.

In some cases, while in the inactive state and during SDT, the UE 115 may perform cell selection or reselection, such that when the UE resumes an active state the UE may communicate with the network via the selected cell. In order to perform cell selection or reselection, the UE 115 may monitor for cell defining CD-SSBs in a default downlink BWP (e.g., a BWP used in activate state communications). However, during SDTs in an inactive state, the UE 115 may not be able to monitor both the initial BWP (e.g., RedCap initial BWP) and the default BWP at the same time. Further, there may not be mechanisms in place to allow the UE 115 to monitor the default BWP and receive the CD-SSBs during SDTs, thereby causing delays in cell selection or reselection. Additionally, in some cases, the network entity 105 may transmit, via the default BWP, updated system information while the UE 115 is performing one or more SDTs in inactive mode. However, if the UE 115 is unable to operate in both the initial BWP and default BWP at the same time during an inactive state, the UE 115 may not be able to receive the updated system information, thereby decreasing reliability in the wireless communications system.

The techniques described herein may enable the UE 115 to pause (e.g., interrupt) the SDTs in order to monitor the default BWP and receive the CD-SSBs, receive updated system information, or both. In some examples, the UE 115 may interrupt the SDTs and perform CD-SSB measurement according to configured periodicity. For example, the UE 115 may receive, from the network entity, a measurement gap configuration that indicates both a duration of a measurement gap and a periodicity of such measurement gap, where during the measurement gap, the UE 115 may interrupt the SDT, monitor the default BWP for the CD-SSBs, and perform CD-SSB measurements. In some other examples, the UE 115 may perform semi-static CD-SSB measurements and interruptions based on the measurements of NCD-SSB in the initial BWP. For example, during SDT, the UE 115 may receive one or more NCD-SSBs and perform one or more measurements on the NCD-SSBs. As such, if the measurements of the NCD-SSBs (e.g., quality of the reference signals) are below a degradation threshold (e.g., meaning the quality of the NCD-SSBs has degraded past a point), the UE 115 may interrupt the SDT and perform CD-SSB measurements in the default BWP, perform measurements on CD-SSBs within the initial BWP, or a combination thereof. In some other examples, the network entity may trigger the UE to interrupt the SDTs and perform CB-SSB measurements. For example, while the UE 115 is performing the SDTs, the network entity may transmit an indication via the initial BWP for the UE 115 to switch to the default BWP and measure the CD-SSBs. In this way, the UE 115 may pause the SDTs in order to monitor the default BWP, receive the CD-SSBS, and measure the CD-SSBs, thereby enabling the UE 115 to perform cell selection or reselection during SDTs.

Further, the techniques described herein may enable a network entity 105 to transmit updated system information during SDTs. In one example, the network entity 105 may transmit an RRC message indicating the updated system information to the UE 115 via the initial BWP. In another example, the network entity 105 may transmit a message indicating for the UE 115 to terminate (e.g., abort) the SDTs and monitor the default BWP in order to receive the system information.

Figure 2:
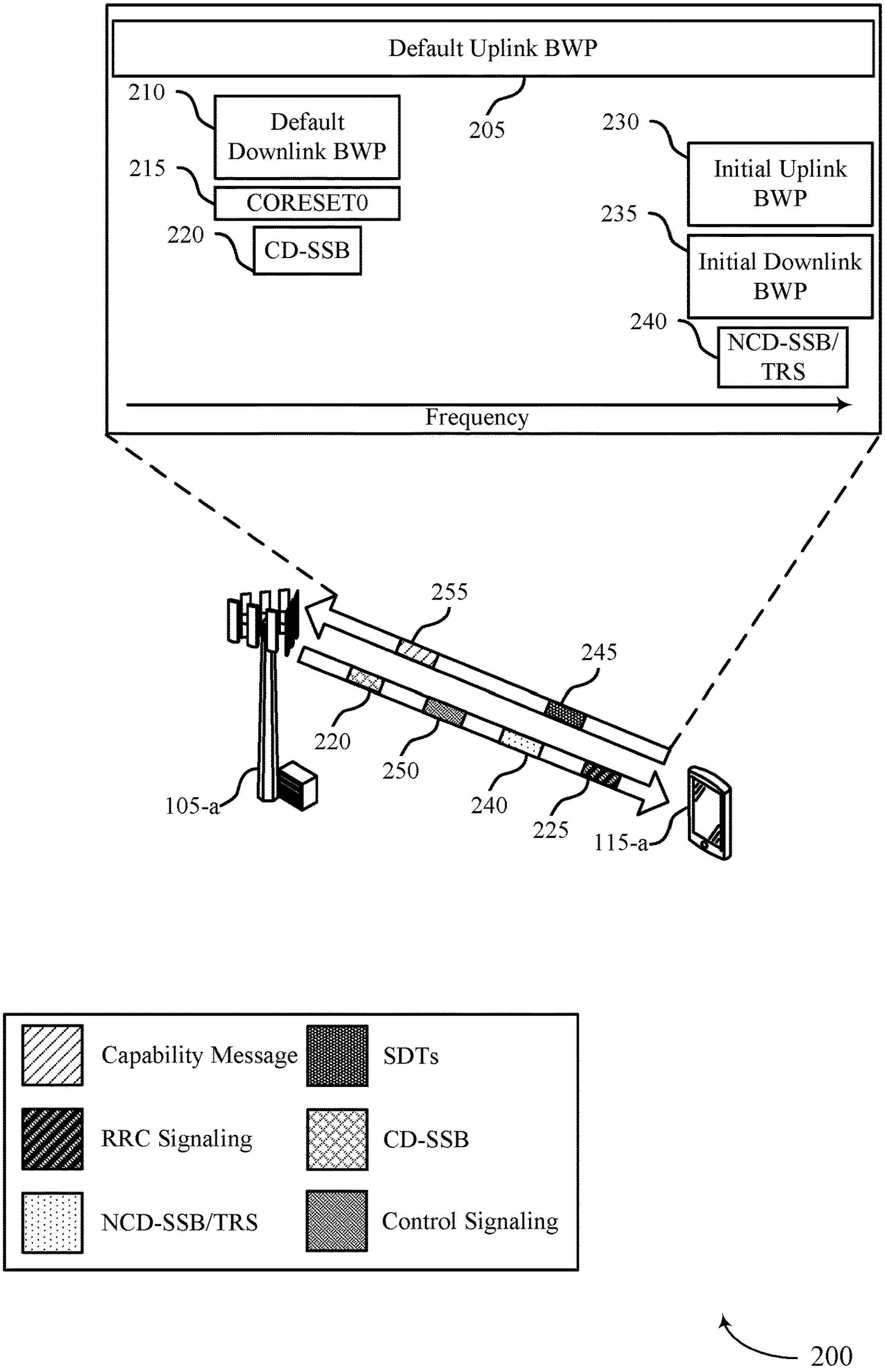
FIG. 2 illustrates an example of a wireless communications system that supports techniques for pausing SDTs in accordance with one or more aspects of the present disclosure.

FIG. 2 illustrates an example of a wireless communications system 200 that supports techniques for pausing SDTs in accordance with one or more aspects of the present disclosure. The wireless communications system 200 may implement or be implemented by aspects of wireless communications system 100 with reference to FIG. 1. For example, the wireless communications system 200 may include a network entity 105-*a* and a UE 115-*a*, which may be examples of a network entity 105 and a UE 115 as described herein with reference to FIG. 1. In some examples, the UE 115-*a* may be an example of a reduced capability UE 115.

In some examples, the network entity 105-*a* and the UE 115-*a* may communicate via a default uplink BWP 205 and a default downlink BWP 210, in cases where the UE 115-*a* and the network entity 105-*a* have an RRC connection (e.g., the UE 115-*a* operates in an active or connected mode). For example, the UE 115-*a* may communicate one or more uplink messages to the network entity 105-*a* via the default uplink BWP 205, while the network entity 105-*a* may communicate one or more downlink messages to the UE 115-*a* via the default downlink BWP 210. Further, the UE 115-*a* may receive CORESET0 215 via the default downlink BWP 210, which may enable the UE 115-*a* to communicate with the network entity 105-*a*. Additionally, the UE 115-*a* may receive one or more CD-SSBs 220 from the network entity 105-*a*, such that the UE 115-*a* may measure the CD-SSBs 220 and perform cell selection or reselection.

In some examples, the network entity 105-*a* may transmit RRC signaling 225 (e.g., such as an RRC release message) to the UE 115-*a*, indicating for the UE 115-*a* to release the current RRC connection and enter an inactive state (e.g., RRC_INACTIVE). In the RRC signaling 225, the network entity 105-*a* may configure the UE 115-*a* with an initial uplink BWP 230 and an initial downlink BWP 235. In such examples, the network entity 105-*a* may transmit one or more NCD-SSBs or TRSs 240, such that the UE 115-*a* may measure or otherwise use the NCD-SSBs or TRSs 240. Further, the network entity 105-*a* may enable the UE 115-*a* to transmit and receive one or more SDTs 245 via the initial uplink BWP 230 and initial downlink BWP 235. For example, the UE 115-*a* may enter the inactive state in accordance with the RRC signaling 225 and transmit one or more SDTs 245 (e.g., uplink messages with relatively smaller amount of data) via the initial uplink BWP 230 and receive one or more SDTs 245 via the initial downlink BWP 235. As illustrated in FIG. 2, the network entity 105-*a* may configure the initial uplink BWP 230 and the initial downlink BWP 235 to be the same BWP, span the same frequency resources, or the like.

As described herein, the network entity 105-*a* may configure the UE 115-*a* with the initial downlink BWP 235 for SDTs 245, while the UE 115-*a* is operating in an inactive mode. In such examples, the UE 115-*a* may receive the NCD-SSBs or TRSs 240 via the initial downlink BWP 235, but may not receive the CD-SSBs 220 or CORESET0 215 via the initial downlink BWP 235 (e.g., as the initial downlink BWP does not contain the CD-SSBs 220 or CORESET0 215). However, if the measurements of the NCD-SSBs or TRSs 240 cannot be used for cell selection or reselection, the UE 115-*a* may measure the CD-SSBs 220 that are transmitted outside the initial downlink. BWP 235 while the UE 115-*a* is performing SDTs 245. That is, in some cases, while the UE 115-*a* is performing one or more SDTs via the initial uplink BWP and the initial downlink BWP 235, the UE 115-*a* may attempt to initiate or perform cell reselection or selection.

In order to perform such cell selection or reselection, the UE 115-*a* may measure one or more CD-SSBs 220 that are received via the default downlink BWP 210 (e.g., and are therefore outside of the initial downlink BWP 235 that the UE 115-*a* is operating in). However, in such cases, there may not be any mechanisms or signaling to enable the UE 115-*a* to monitor the default downlink BWP 210, receive the CD-SSBs 220 via the default downlink BWP 210, and measure the CD-SSBs 220 while performing SDTs 245 in an inactive mode. That is, there may not be any mechanisms for determining how often the UE 115-*a* may measure the CD-SSBs 220 while performing SDT in an inactive mode, for determining what interruption duration may be allowed, or determining what may trigger the measurements of the CD-SSBs 220, interruption of the SDTs 245, or how the network may control such aspects. Further, the UE 115-*a* may be incapable of monitoring both the default downlink BWP 210 and the initial downlink BWP 235 at the same time. In such scenarios, the UE 115-*a* may not be able to perform measurements on the CD-SSBs and cell selection or re-selection, thereby increasing latency and reducing reliability in the communications system.

In some implementations of the wireless communications system 200, the UE 115-*a* may pause (e.g., interrupt) the transmissions of the SDTs 245 in order to monitor the default downlink BWP 210, receive the CD-SSBs 220, and measure the CD-SSBs 220. During the interruption time (e.g., the time the SDTs are paused), the UE 115-*a*, operating in inactive mode, may not transmit uplink signals or channels in the initial uplink BWP 230, or receive downlink signals or channels in the initial downlink BWP 235. That is, the UE 115-*a* may not transmit or receive SDTs 245 during the time that the SDTs 245 are paused.

In some examples, the UE 115-*a* may pause the transmission of the SDTs 245 periodically. For example, the UE 115-*a* may receive control signaling 250 (e.g., such as system information or downlink control information (DCI)) or RRC signaling 225, via the initial downlink BWP 235, indicating a length of a measurement gap (e.g., MGL) for measuring the CD-SSBs 220 and a periodicity of the measurement gap (e.g., MGRP), such that the UE 115-*a* may pause the transmissions of the SDTs 245 in accordance with measurement gap. In such examples, the UE 115-*a*, operating in the inactive mode, may transmit one or more SDTs 245 in the initial uplink BWP 230 and the initial downlink BWP 235, pause the transmission of the one or more SDTs 245 in accordance with the indicated measurement gap, monitor the default downlink BWP 210 for the CD-SSBs 220, and measure the CD-SSBs 220 during the measurement gap. Based on measuring the CD-SSBs 220, the UE 115-*a* may resume the transmission of the one or more SDTs 245. The UE 115-*a* may pause the transmission of the SDTs 245 periodically in accordance with the indicated periodicity. In some other examples, the UE 115-*a* may periodically pause the transmission of the SDTs 245 in accordance with a DRX cycle of the UE 115-*a*, where the periodicity is equal to the DRX cycle period. Further, the UE 115-*a* may periodically pause the transmission of the SDTs 245 in accordance with a paging occasion of the UE 115-*a*. Such techniques (e.g., periodically pausing SDT transmissions) may be further described herein with reference to FIG. 3.

In some other examples, the UE 115-*a* may semi-statically pause the SDTs 245 in accordance with one or more measurements of the NCD-SSBs or TRSs 240. For example, the UE 115-*a* may receive control signaling 250 (e.g., system information) indicating a degradation threshold associated with the NCD-SSBs or TRSs 240 to the UE 115. The UE 115-*a* may receive one or more NCD-SSBs or TRSs 240 and perform one or more measurements the NCD-SSBs or TRSs 240. The UE 115-*a* may compare the one or more measurements (e.g., RSRP, RSRQ, or the like) with the degradation threshold. If the one or more measurements satisfy the degradation threshold (e.g., the measurements are below the threshold), then the UE 115-*a* may pause the transmission of the SDTs 245, monitor the default downlink BWP 210 for the CD-SSBs 220, and measure the CD-SSBs 220. Alternatively, if the one or more measurements of the NCD-SSBs or TRSs 240 satisfy the degradation threshold (e.g., the measurements are below the threshold), then the UE 115-*a* may pause the transmission of the SDTs 245, monitor the initial downlink BWP 235 for the NCD-SSBs or TRSs 240 from neighboring cells, and measure such NCD-SSBs or TRSs 240. Such techniques (e.g., semi-statically pausing performance of SDTs 245) may be further described herein with reference to FIG. 3.

In some other examples, the UE 115-*a* may aperiodically pause transmission of the SDTs 245 in accordance with a network trigger. For example, the UE 115-*a* may receive, via the initial downlink BWP 235, control signaling 250 (e.g., such as MAC control element (MAC-CE), a physical downlink control channel (PDCCH) message, a DCI message) indicating to monitor the default downlink BWP 210 and measure the CD-SSBs 220. In some examples, the network entity 105-*a* may transmit the control signaling 250 indicating for the UE 115-*a* to pause the transmission of the SDTs 245 and measure the CD-SSBs 220 in accordance with a measurement report from the UE 115-*a*. That is, the UE 115-*a* may measure one or more NCD-SSBs or TRSs 240 and transmit a measurement report to the network entity 105-*a*. In accordance with the measurement report, the network entity 105-*a* may transmit the control signaling 250. Such techniques (e.g., aperiodically pausing performance of SDTs 245) may be further described herein with reference to FIG. 3.

In some other examples, the UE 115-*a* may refrain from pausing the SDTs 245 and simultaneously perform the transmission of the SDTs 245 via the initial uplink BWP 230 and the initial downlink BWP 235 and measurements of the CD-SSBs 220 via the default downlink BWP 210 in accordance with the capabilities of the UE 115-*a*. For example, the UE 115-*a* may transmit a capability message 255 indicating a capability of the UE 115-*a* to operate in the initial uplink BWP 230 and the initial downlink BWP 235 (e.g., the first BWP) without receiving CD-SSBs 220 and the CORESET0 215 via the default downlink BWP 210 (e.g., the second BWP). In accordance with the capability message 255, the network entity 105-*a* may refrain from enabling the UE 115-*a* to pause the transmission of the SDTs 245. As such, the UE 115-*a* may simultaneously monitor the default downlink BWP 210 and measure the CD-SSBs 220 and perform the SDTs 245 in the initial uplink BWP 230 and the initial downlink BWP 235. Such techniques (e.g., refraining pausing performance of SDTs 245) may be further described herein with reference to FIG. 3.

In some cases, while the UE 115-*a* and network entity 105-*a* are performing one or more SDTs 245, the network entity 105-*a* may update system information and transmit the updated system information to the UE 115-*a* via the default downlink BWP 210. However, if the system information is updated and transmitted during the middle of the SDT, the UE 115-*a* may not be able to obtain the updated system information, due to the inability for the UE 115-*a* to monitor both the default downlink BWP 210 and the initial downlink BWP 235, simultaneously.

In some implementations of the wireless communications system 200, the network entity 105-*a* may transmit an indication of the updated system information via dedicated signaling (e.g., such as RRC signaling 225 or MAC-CE) to the UE 115-*a* via the initial downlink BWP. That is, if the network entity 105-*a* may transmit the updated system information via the initial downlink BWP, such that the UE 115-*a* may refrain from pausing the transmissions of the SDTs. In some other implementations, the network entity 105-*a* may transmit, to the UE 115-*a* via the initial downlink BWP 235, an indication to terminate (e.g., abort) the SDTs 245 (e.g., SDT session), such that the UE 115-*a* may monitor (e.g., fall back) to the default downlink BWP 210 and receive the updated system information. That is, the network entity 105-*a* may transmit an indication to the UE 115-*a* to terminate the SDTs 245, such that the UE 115-*a* may monitor the default downlink BWP 210 and receive the updated system information.

Figure 3:
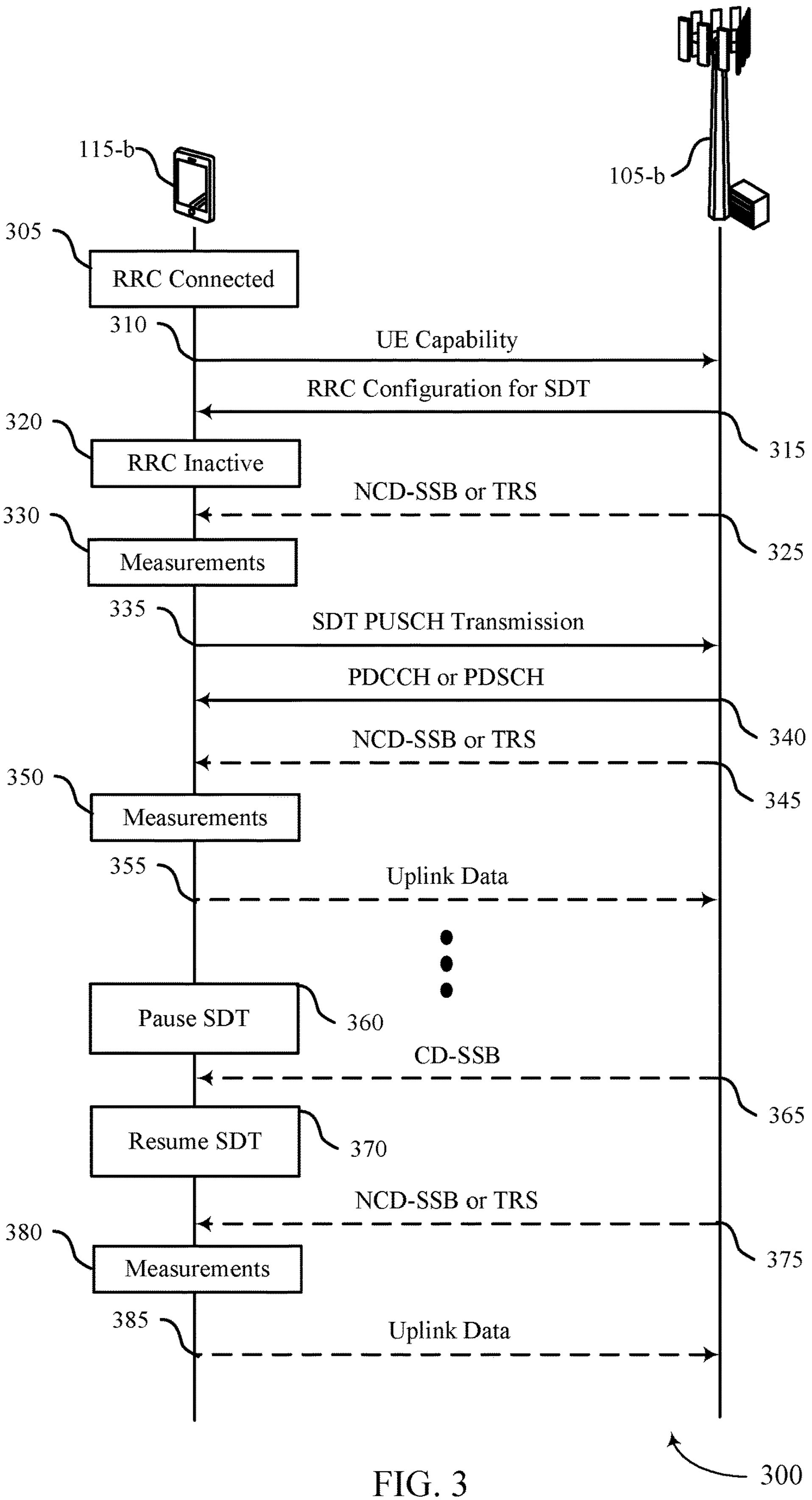
FIGS. 3 through 7 illustrate examples of process flows that support techniques for pausing SDTs in accordance with one or more aspects of the present disclosure.

FIG. 3 illustrates an example of a process flow 300 that supports techniques for pausing SDTs in accordance with one or more aspects of the present disclosure. The process flow 300 may implement or be implemented by aspects of wireless communications system 100 and the wireless communications system 200. For example, the process flow 300 may include a network entity 105-*b* and a UE 115-*b*, which may be examples of a network entities 105 and a UEs 115 as described herein with reference to FIGS. 1 through 2. In some examples, the UE 115-*b* may be an example of a reduced capability UE 115. In the following description of the process flow 300, the operations may be performed in a different order than the order shown. Specific operations also may be left out of the process flow 300, or other operations may be added to the process flow 300. Further, although some operations or signaling may be shown to occur at different times for discussion purposes, these operations may actually occur at the same time. The process flow 300 may describe techniques for pausing SDT transmissions during RACH based SDTs or CG based SDTs.

At 305, the UE 115-*b* (e.g., a reduced capability UE) may operate in an active or connected state (e.g., RRC_CONNECTED). While operating in the connected state, the UE 115-*b* may communicate with the network entity 105-*b* via a default uplink BWP and a default downlink BWP, which may be examples of the default uplink BWP 205 and the default downlink BWP 210 described herein with reference to FIG. 2.

At 310, the UE 115-*b* may transmit a UE capability message indicating a capability for the UE to perform SDTs. The SDTs may be examples of SDTs 245 as described herein with reference to FIG. 2. A SDT may be the transmission of a small a relatively amount of data (e.g., relative to an uplink or downlink transmission in an connected state) while the UE 115-*b* is operating in an inactive, without having to reconnect with the network entity 105-*b*. That is, the UE 115-*b* may perform one or more SDTs while being in the RRC_INACTIVE state.

At 315, the UE 115-*b* may receive, from the network entity 105-*a*, an RRC configuration for SDTs. For example, the UE 115-*b* may receive an RRC release message indicating for the UE 115-*b* to release the current RRC connection and enter an inactive state. Further, the network entity 105-*b* may indicate, via the RRC release message, an initial uplink BWP and an initial downlink BWP, such that the UE 115-*b* may perform the SDTs via such BWPs. In some examples, the initial uplink BWP and the initial downlink BWP may be the same and be referred to as the initial BWP, first BWP, etc. The initial uplink BWP and the initial downlink BWP may be examples of the initial uplink BWP 230 and the initial downlink BWP 235 as described herein with reference to FIG. 2.

At 320, in accordance with receiving the RRC configuration, the UE 115-*b* may enter the inactive state. At 325, the network entity 105-*b* may transmit one or more NCD-SSBs or TRSs. The network entity 105-*b* may transmit the NCD-SSBs or TRSs via the initial downlink BWP configured for SDTs. At 330, the UE 115-*b* may perform one or more measurements on the NCD-SSBs or TRSs, and report such measurements to the network entity 105-*b*.

At 335, the UE 115-*b* may transmit a first SDT via a PUSCH in the initial uplink BWP. The first SDT may include an RRC resume request. At 340, the network entity 105-*b* may respond by transmitting a SDT via a PDCCH or a physical downlink shared channel (PDSCH) in the initial downlink BWP. The PDCCH or the PDSCH may be scrambled in accordance with an ID of the UE 115-*b*. At 345, the network entity 105-*b* may transmit one or more additional NCD-SSBs or TRSs, such that, at 350, the UE 115-*b* may perform one or more measurements of the NCD-SSBs or TRSs and report such measurements back to the network entity 105-*b*.

At 355, the UE 115-*b* may transmit, to the network entity 105-*b* via the initial uplink BWP, one or more SDTs that include uplink data while operating in an inactive mode. The UE 115-*b* may receive, via the initial downlink BWP, one or more SDTs from the network entity 105-*b* that include downlink data while operating in the inactive mode. That is, the UE 115-*b* and the network entity 105-*b* perform such SDTs via the initial BWPs configured in the RRC configuration for SDT at 315.

As described herein, at 360, the UE 115-*b* may pause the transmission of one or more SDTs in order to measure a first set of CD-SSBs for cell selection or reselection. For example, the UE 115-*b* may tune to the default BWP to monitor for the first set of CD-SSBs. At 365, the UE 115-*b* may receive the first set of CD-SSBs in accordance with monitoring the default BWP. The UE 115-*b* may measure at least a first CD-SSB of the first set of CD-SSBs in accordance with receiving the CD-SSBs.

In some examples, at 360, the UE 115-*b* may pause the transmission of SDTs for an indicated duration of time and in accordance with a periodicity. For example, the UE 115-*b* may perform periodic interruptions in order to monitor intra-frequency and inter-frequency cells while performing RACH based SDTs or CG based SDTs. In such examples, the duration of time the SDTs may be paused (e.g., interruption times) in each frequency may be equal to an SMTC duration in that frequency plus a fixed value. As an illustrative example, the fixed value may be 1 ms=2*0.5 ms in FR1 where 0.5 ms may represent the time to switch in one direction for SSB measurements at the UE 115-*b*. As another illustrative example, the fixed value can be 0.5 ms=2*0.25 ms in FR2, where 0.25 ms may represent the time to switch in one direction for SSB measurements at the UE 115-*b*. That is, UE 115-*b* may pause the transmission of the SDTs for a duration time in accordance with an indicated SMTC value for the frequency the UE 115-*b* is operating in (e.g., FR1 or FR2) and a fixed value, where the fixed value is associated with the time it takes for the UE 115-*b* to switch between two BWPs (e.g., the switching time between the initial BWP and default BWP). Further, the fixed value may be based on the frequency range (e.g., FR1 or FR2) with which the UE 115-*b* is operating in. As such, the fixed value may vary across the frequency ranges. That is, the fixed value associated with FR1 may differ from the fixed value associated with FR2.

Further, the network entity 105-*b* may transmit a measurement gap configuration, to the UE 115-*b*, while the UE 115-*b* is operating in the inactive mode. The network entity 105-*b* may transmit the measurement gap configuration through system information or dedicated RRC signaling (e.g., RRC Release message in CG based SDTs or RRC message after contention resolution in RACH based SDTs). The network entity 105-*b* may use the measurement configuration in order to control the measurement lengths and periodicity of measurements at the UE 115-*b*. In such examples, the interruption time (e.g., duration of time the UE 115-*b* may pause SDT transmissions) may be equal to a measurement gap in inactive mode. That is, the UE 115-*b* may receive the measurement gap configuration, such that the UE 115-*b* may pause the transmission of SDTs in accordance with the measurement gap (e.g., in accordance with the length or duration of the measurement gap and the periodicity of the measurement gap.

Using current techniques, the network entity 105-*b* may transmit a measurement gap configuration via dedicated signaling while the UE 115-*b* is operating in a connected mode. As such, the network entity 105-*b* may configure the range of measurement gap durations in inactive mode to be same as the ranges in the connected mode. Further, the network entity 105-*b* may configure the range of measurement gap periodicities, while the UE 115-*b* is operating in inactive mode, to be relatively longer than those configured for UEs 115 operating in an active mode. The network entity 105-*b* may indicate the measurement gap periodicity in units of DRX cycles. Further, the network entity 105-*b* may configure the range of measurement gap offsets in inactive mode to be adjusted according to the range of periodicities.

For example, if the UE 115-*b* receives an indication of the measurement gap configuration, the UE 115-*b* may pause the transmission of the SDTs in accordance with the measurement gap periodicity. Further, the UE 115-*b* may pause the transmission of the SDTs for a duration of time in accordance with the length of the measurement gap. During the measurement gap (e.g., pause or interruption time), the UE 115-*b*, the network entity 105-*b*, or both may pause or suspend the timing advance timer for both RACH based SDTs or CD based SDTs. Based on completing the CD-SSB measurements during the measurement gap, the UE 115-*b*, the network entity 105-*b*, or both may resume or re-start the timing advance timer and resume SDT activity, In some examples, at 360, the network entity 105-*b* may not explicitly configure the measurement gap while the UE 115-*b* is operating in an inactive mode. In such examples, the UE 115-*b* may pause the transmission of SDTs (e.g., interrupt the SDTs) adjacent to one CD-SSB burst out of all CD-SSB bursts within DRX period. That is, the UE 115-*b* may pause the SDTs and perform measurements with a periodicity that is equal to the DRX cycle period. As such, the UE 115-*b* may pause the SDT transmissions when the CD-SSB burst is within a threshold time from the corresponding paging monitoring occasion of the UE 115-*b*. That is, the UE 115-*b* may interrupt the CD-SSB burst that is closer to the corresponding paging monitoring occasion of the UE 115-*b*. Further, if the CD-SSB and the corresponding paging PDCCH of the UE 115-*b* are close to each other (e.g., within a threshold amount of time), the UE 115-*b* may interrupt during the time frame (e.g., minimum time span) that covers both the CD-SSB and the PDCCH. That is, the UE 115-*b* may pause the SDTs and measure the CD-SSBs during a time frame that includes a transmission of the CD-SSBs and a paging occasion of the UE 115-*b*.

In some other examples, at 360, the UE 115-*b* may semi-statically pause the SDTs and monitor for the CD-SSBs via the default BWP, the initial BWP, or both in accordance with the quality of the NCD-SSB. For example, at 345, the UE 115-*b* may monitor and receive one or more NCD-SSBs or TRSs transmitted from a serving cell via the initial downlink BWP. In such examples, at 350, the UE 115-*b* may measure the NCD-SSBs or TRSs from the serving cell and compare such measurements to a degradation threshold. If the measurements (e.g., quality) of the NCD-SSBs or the TRSs of the serving cell have degraded below a degradation threshold, the UE 115-*b* may pause transmission of the SDTs and measure CD-SSBs of neighboring cells periodically in the default BWP. Further, if the measurement of the NCD-SSBs or TRSs from a serving cell have degraded below the degradation threshold, the UE 115-*b* may pause the transmission of the SDTs and monitor for CD-SSBs of neighboring cells in cases that the subcarrier spacing of the CD-SSB of the neighboring cell is different from NCD-SSB of the serving cell.

In such examples, the network entity 105-*b* may transmit system information indicating the degradation threshold to the UE 115-*b*. Additionally, in such examples, the UE 115-*b* may pause the SDTs and measure the CD-SSBs in either the initial BWP or default BWP in accordance with a periodicity indicated in an intra-frequency neighboring cell measurement configuration. Further, the UE 115-*b* may pause the transmission of the SDTs for a duration time in accordance with an indicated SMTC value for the frequency the UE 115-*b* is operating in (e.g., FR1 or FR2) and a fixed value, where the fixed value is associated with the time it takes for the UE 115-*b* to switch directions in SSB measurements.

In some other examples, at 360, the UE 115-*b* may pause the SDTs and perform measurements of CD-SSBs in the default BWP aperiodically in accordance with a network trigger. For example, while performing the SDTs, the network entity 105-*b* may transmit an indication, to the UE 115-*b* via the initial BWP, to switch to monitoring the default BWP, receive and measure the CD-SSBs, and switch back to the initial BWP. That is, the network entity 105-*b* may transmit an indication for the UE 115-*b* to measure the CD-SSBS received via the default BWP. The network entity 105-*b* may transmit such an indication via a PDCCH or MAC-CE message. In such examples, the network entity 105-*b* may transmit the indication (e.g., trigger the UE 115-*b*) in accordance with a measurement report of the NCD-SSB or TRSs. That is, at 345 and 350, the UE 115-*b* may receive and measure one or more NCD-SSBs or TRSs and periodically report such measurements to the network entity 105-*b* via the initial BWP. As such, in accordance with the measurement values in the measurement report (e.g., such as RSRP or RSRQ), the network entity 105-*b* may determine whether to transmit the indication for the UE 115-*b* to pause the SDTs and monitor the default BWP for the CD-SSBs.

In some examples, the UE 115-*b* may refrain from pausing the SDTs in accordance with the capability of the UE 115-*b*. For example, the UE 115-*b* may transmit a capability message to the network entity 105-*b*. If the UE 115-*b* indicates, via the capability message, that the UE 115-*b* may operate in a BWP without receiving a CD-SSB and CORESET0, then the network entity 105-*b* may not allow any interruptions during SDTs for the UE 115-*b* to measure CD-SSB received from default BWP during inactive mode. In such examples, the UE 115-*b* may simultaneously measure the CD-SSB from the default BWP and perform SDTs in the initial BWP. That is, if the UE 115-*b* indicates that it may operate in an RRC configured downlink BWP without requiring a CD-SSB or CORESET0 while also operating in inactive mode, then the UE 115-*b* may refrain from pausing the SDTs and may simultaneously monitor the default BWP for CD-SSBs and perform the SDTs via the initial BWP.

In accordance with measuring the CD-SSBs via the various techniques described herein (e.g., periodically, semi-statically, aperiodically, or refraining), the UE 115-*b* may resume the performance of the one or more SDTs at 370. For example, the UE 115-*b* may tune back to monitoring the initial BWP and resume transmission of the SDTs. At 375, the UE 115-*b* may receive one or more additional NCD-SSBs or TRSs, where, at 380, the UE 115-*b* may perform one or more measurements on such NCD-SSBs or TRSs and report such measurements to the network entity 105-*b*. Additionally, at 385, the UE 115-*b* may perform the SDTs and transmit uplink data to the network entity 105-*b*.

Figure 4:
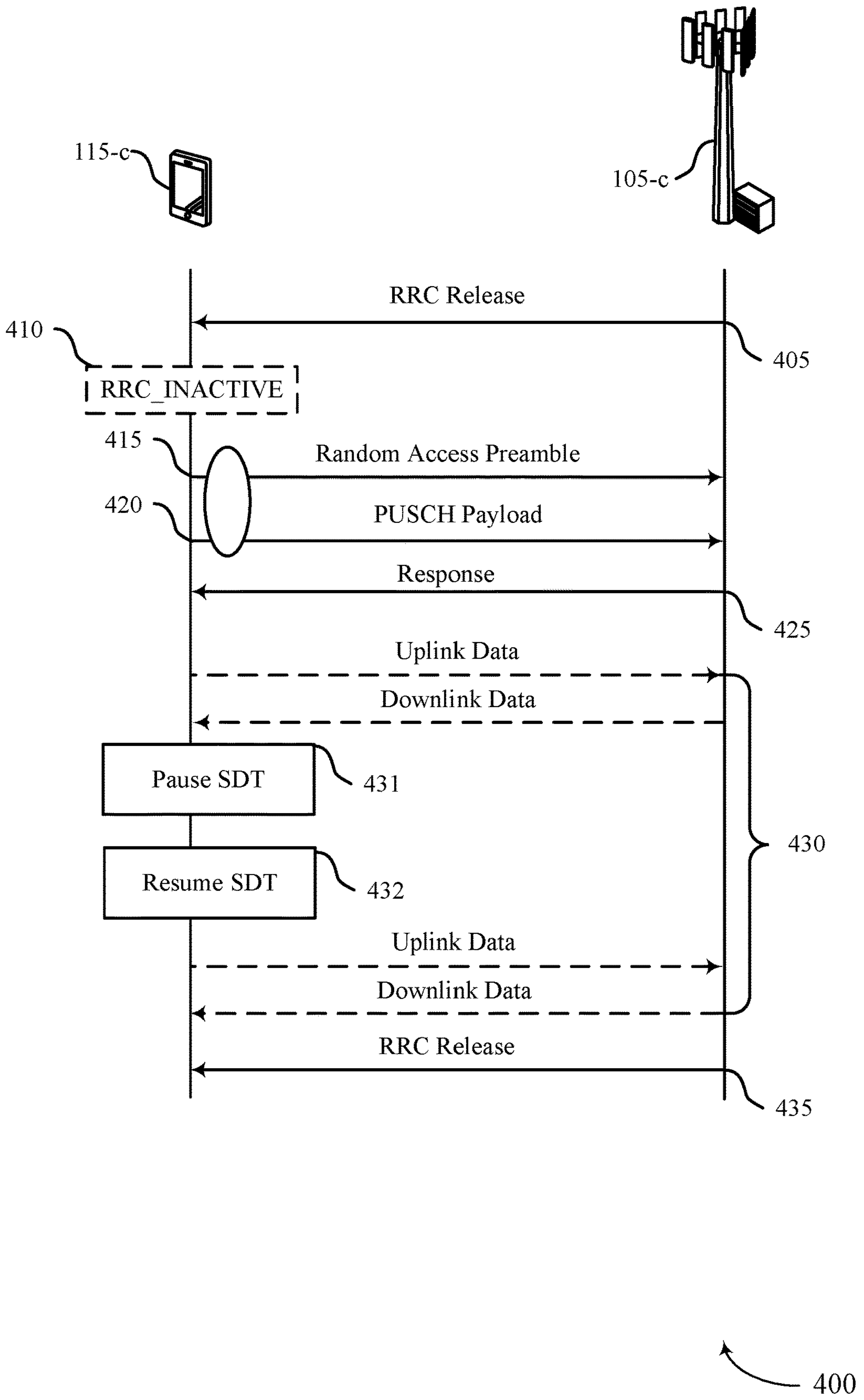

FIG. 4 illustrates an example of a process flow 400 that supports techniques for pausing SDTs in accordance with one or more aspects of the present disclosure. The process flow 400 may implement or be implemented by aspects of wireless communications system 100, the wireless communications system 200, and the process flow 300. For example, the process flow 400 may include a network entity 105-*c* and a UE 115-*c*, which may be examples of a network entities 105 and a UEs 115 as described herein with reference to FIGS. 1 through 3. In some examples, the UE 115-*c* may be an example of a reduced capability UE 115. In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time. The process flow 400 may describe techniques for pausing SDT transmissions during a two-step RACH based SDT.

At 405, the UE 115-*c* may receive, from the network entity 105-*c*, an RRC release message indicating for the UE 115-*c* to release an RRC connection. The RRC release message may include a connection suspension configuration indicating an initial BWP, such that the UE 115-*c* may perform SDTs. At 410, the UE 115-*c* may release the RRC connection and enter an inactive mode (e.g., RRC_INACTIVE mode). At 415, the UE 115-*b* may transmit a random access preamble (e.g., MSG 1 of the RACH procedure). At 420, the UE 115-*c* may transmit PUSCH data to the network entity 105-*c* that includes an RRC resume request, uplink data, a buffer status report, a MAC-CE, or a combination thereof (e.g., MSG 3 of RACH procedure). The procedures at 415 and 420 may be completed together. That is, the UE 115-*c* may transmit the random access preamble and the PUSCH data in the same message (e.g., one message include MSG 1 and MSG 3 in the RACH procedure). At 425, the UE 115-*c* may receive a random access response that includes a response to the random access preamble, downlink data, a contention resolution message, or a combination thereof (e.g., MSG 2 and MSG 4).

At 430, in accordance with the random access response, the UE 115-*c* and the network entity 105-*c* may perform one or more SDTs via the initial BWP. That is, the UE 115-*c*, while operating in the inactive mode, may transmit uplink data and receive downlink data. In some examples, at 431 the UE 115-*c* may pause the performance of the one or more SDTs to monitor for CD-SSBs in a default BWP. The UE 115-*c* may pause the performance of the one or more SDTs in accordance with the techniques described herein with reference to FIGS. 1 through 3. In accordance with pausing the SDTs and performing the measurements, the UE 115-*c* may resume the SDTs at 432. At 435, the UE 115-*c* may receive an RRC release message. In this way, the UE 115-*c* may pause the performance of the SDTs via an initial BWP and monitor a default BWP for CD-SSBs in a two-step RACH based SDT procedure.

Figure 5:
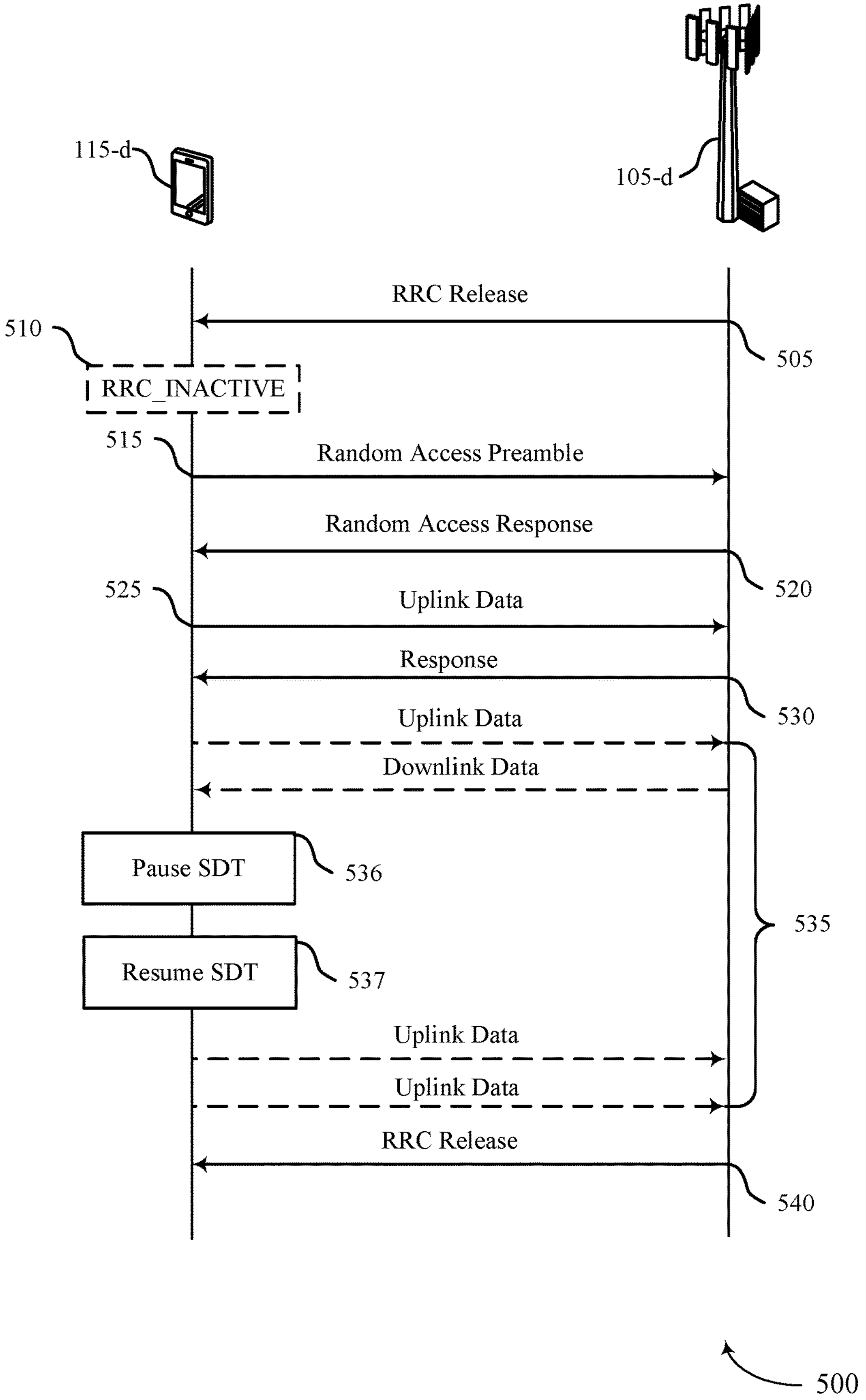

FIG. 5 illustrates an example of a process flow 500 that supports techniques for pausing SDTs in accordance with one or more aspects of the present disclosure. The process flow 500 may implement or be implemented by aspects of wireless communications system 100, the wireless communications system 200, the process flow 300, and the process flow 400. For example, the process flow 500 may include a network entity 105-*d* and a UE 115-*d*, which may be examples of a network entities 105 and a UEs 115 as described herein with reference to FIGS. 1 through 4. In some examples, the UE 115-*d* may be an example of a reduced capability UE 115. In the following description of the process flow 500, the operations may be performed in a different order than the order shown. Specific operations also may be left out of the process flow 500, or other operations may be added to the process flow 500. Further, although some operations or signaling may be shown to occur at different times for discussion purposes, these operations may actually occur at the same time. The process flow 500 may describe techniques for pausing SDT transmissions during a four-step RACH based SDT.

At 505, the UE 115-*d* may receive, from the network entity 105-*d*, an RRC release message indicating for the UE 115-*d* to release an RRC connection. The RRC release message may include a connection suspension configuration indicating an initial BWP, such that the UE 115-*d* may perform SDTs. At 510, the UE 115-*d* may release the RRC connection and enter an inactive mode (e.g., RRC_INACTIVE mode). At 515, the UE 115-*d* may transmit a random access preamble (e.g., MSG 1 of the RACH procedure). At 520, the UE 115-*d* may receive a random access response (e.g., MSG 2 of the RACH procedure). At 525, the UE 115-*d* may transmit a first uplink message including an RRC resume request message, uplink data, a buffer status report, a MAC-CE, or a combination thereof (e.g., MSG 3 of RACH procedure). At 530, the UE 115-*d* may receive a response indicating a contention resolution, downlink data, or a combination thereof (e.g., MSG 4 of the RACH procedure).

At 535, in accordance with the four-step RACH procedure, the UE 115-*d* and the network entity 105-*d* may perform one or more SDTs via the initial BWP. That is, the UE 115-*d*, while operating in the inactive mode, may transmit uplink data and receive downlink data via the initial BWP. In some examples, at 536, the UE 115-*d* may pause the performance of the one or more SDTs to monitor for CD-SSBs in a default BWP. The UE 115-*d* may pause the performance of the one or more SDTs in accordance with the techniques described herein with reference to FIGS. 1 through 3. In accordance with pausing the SDTs and performing the measurements, the UE 115-*d* may resume the SDTs at 537. At 540, the UE 115-*d* may receive an RRC release message indicating to release an RRC connection. In this way, the UE 115-*d* may pause the performance of the SDTs via an initial BWP and monitor a default BWP for CD-SSBs during a four-step RACH based SDT procedure.

Figure 6:
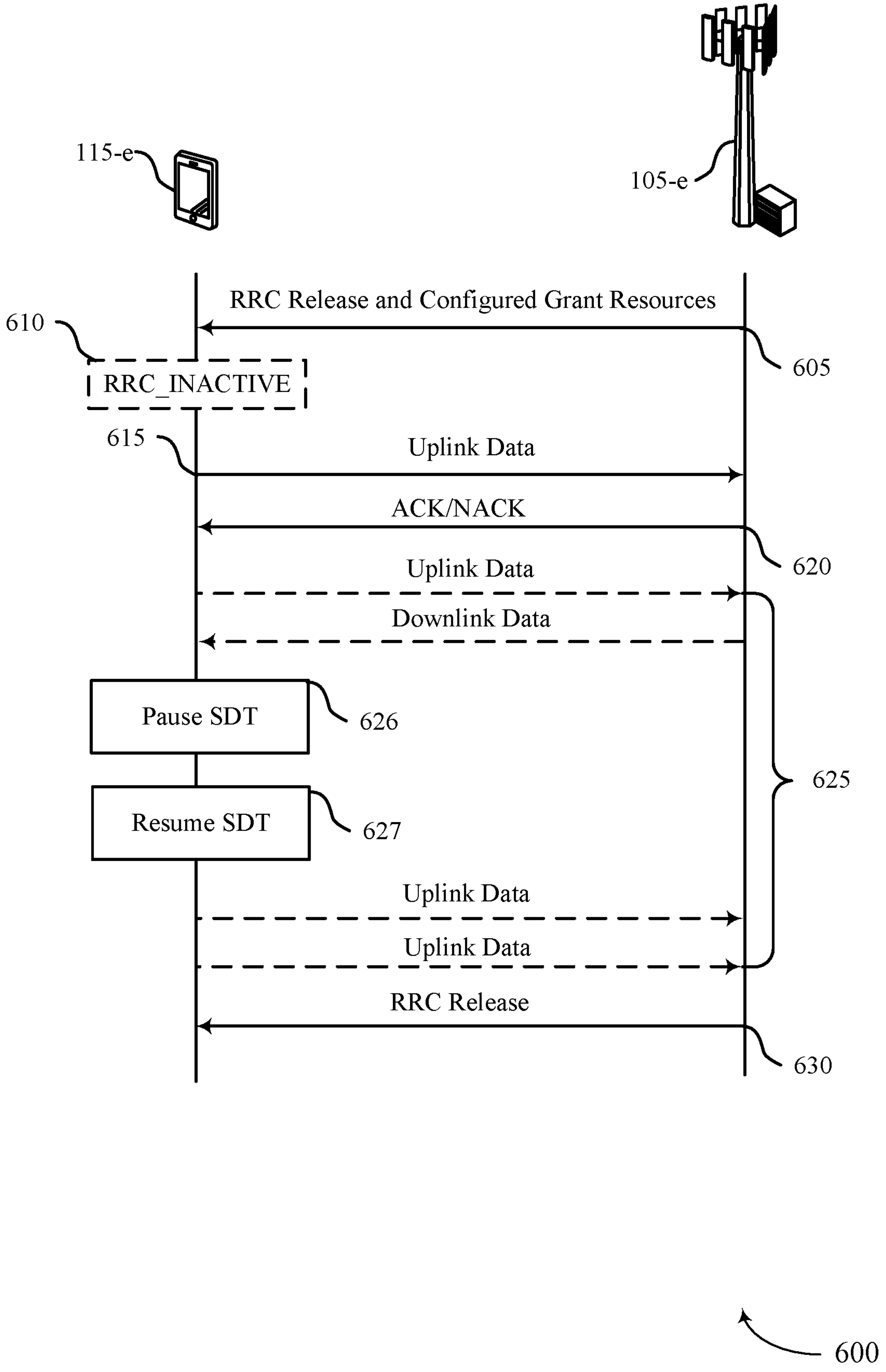

FIG. 6 illustrates an example of a process flow 600 that supports techniques for pausing SDTs in accordance with one or more aspects of the present disclosure. The process flow 600 may implement or be implemented by aspects of wireless communications system 100, the wireless communications system 200, the process flow 300, the process flow 400, and the process flow 500. For example, the process flow 500 may include a network entity 105-*e* and a UE 115-*e*, which may be examples of a network entities 105 and a UEs 115 as described herein with reference to FIGS. 1 through 5. In some examples, the UE 115-*e* may be an example of a reduced capability UE 115. In the following description of the process flow 600, the operations may be performed in a different order than the order shown. Specific operations also may be left out of the process flow 600, or other operations may be added to the process flow 600. Further, although some operations or signaling may be shown to occur at different times for discussion purposes, these operations may actually occur at the same time. The process flow 600 may describe techniques for pausing SDT transmissions during a CG-based SDT.

At 605, the UE 115-*e* may receive, from the network entity 105-*e*, a CG resource configuration via an RRC release message indicating for the UE 115-*e* to release an RRC connection. The CG resource configuration may indicate an initial BWP, such that the UE 115-*e* may perform SDTs via the initial BWP. At 610, the UE 115-*e* may release the RRC connection and enter an inactive mode (e.g., RRC_INACTIVE mode). At 615, the UE 115-*e* may transmit uplink data as part of the SDT to the network entity 105-*e*, where the uplink data may be an example of a CG transmission and include an RRC resume request message, uplink data, or a combination thereof. At 620, the network entity 105-*e* may transmit an acknowledgement (ACK) or negative ACK (NACK) indicating whether the network entity 105-*e* successfully received and decoded the uplink data or if retransmission is required.

At 625, in accordance with CG-based SDTs procedure, the UE 115-*e* and the network entity 105-*e* may perform one or more SDTs via the initial BWP. That is, the UE 115-*e*, while operating in the inactive mode, may transmit uplink data and receive downlink data. In some examples, at 626, the UE 115-*e* may pause the performance of the one or more SDTs to monitor for CD-SSBs in a default BWP. The UE 115-*e* may pause the performance of the one or more SDTs in accordance with the techniques described herein with reference to FIGS. 1 through 3. In accordance with pausing the SDTs and performing the measurements, the UE 115-*e* may resume the SDTs at 627. At 630, the UE 115-*e* may receive an RRC release message. In this way, the UE 115-*e* may pause the performance of the SDTs via an initial BWP and monitor a default BWP for CD-SSBs in a CD-based SDT procedure.

Figure 7:
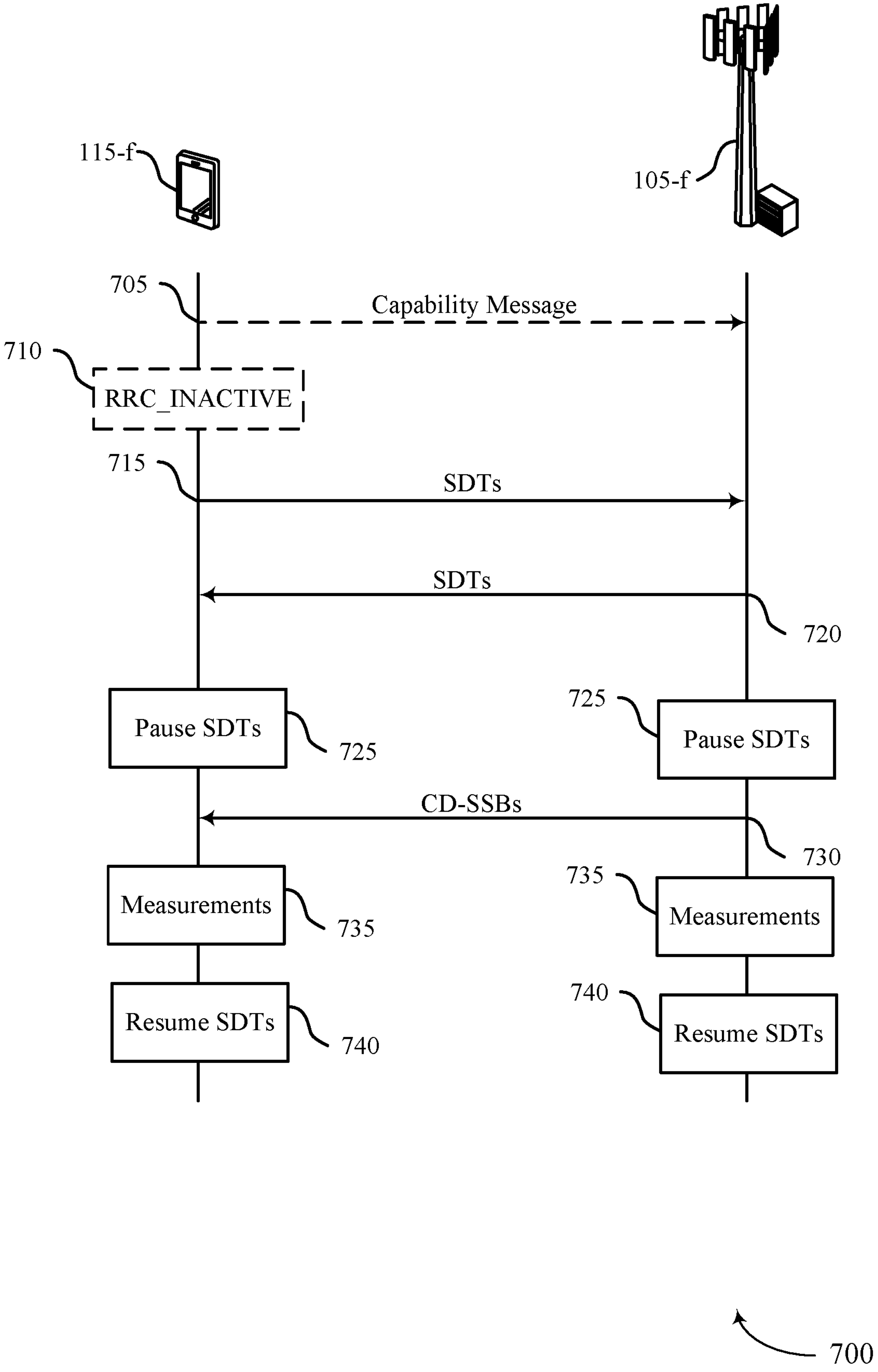

FIG. 7 illustrates an example of a process flow 700 that supports techniques for pausing SDTs in accordance with one or more aspects of the present disclosure. The process flow 700 may implement or be implemented by aspects of wireless communications system 100, the wireless communications system 200, the process flow 300, the process flow 400, the process flow 500, and the process flow 600. For example, the process flow 700 may include a network entity 105-*f* and a UE 115-*f*, which may be examples of a network entities 105 and a UEs 115 as described herein with reference to FIGS. 1 through 6. In some examples, the UE 115-*f* may be an example of a reduced capability UE 115. In the following description of the process flow 600, the operations may be performed in a different order than the order shown. Specific operations also may be left out of the process flow 600, or other operations may be added to the process flow 700. Further, although some operations or signaling may be shown to occur at different times for discussion purposes, these operations may actually occur at the same time. The process flow 700 may describe techniques for pausing SDT transmissions in an initial BWP (e.g., a first BWP) to monitor for CD-SSBs in a default BWP (e.g., a second BWP).

At 705, the UE 115-*f* may transmit a capability message indicating a capability of the UE to operate in the first BWP without receiving the first set of reference signals and one or more resources associated with the second BWP. The first BWP may be an example of the initial BWP as described herein with reference to FIGS. 1 through 6 (e.g., redcap initial downlink BWP and redcap initial uplink BWP). In such examples, the UE 115-*f* may refrain from pausing SDTs in the first BWP. As such, the UE 115-*f* may simultaneously perform one or more SDTs in the first BWP and monitor for, and measure, CD-SSBs in the second BWP.

At 710, the UE 115-*f* may receive an RRC release message and enter an inactive mode (e.g., RRC_INACTIVE mode). At 715 and 720, the UE 115-*f* may transmit and receive, in the inactive mode, one or more SDTs via the first BWP. That is, the UE 115-*f* and network entity 105-*f* may perform one or more SDTs.

At 725, the UE 115-*f* may pause, while operating in the inactive mode, the transmission of the one or more SDTs in the first BWP in order to monitor the second BWP for a first set of reference signals. The UE 115-*f* may pause the transmission of the one or more SDTs for a duration of time that is in accordance with a measurement time window (e.g., SMTC window) and a fixed value. In some examples, the UE 115-*f* may pause the transmission of the one or more SDTs in the BWP periodically in accordance with an indication of a measurement gap configuration. a DRX cycle, a paging occasion of the UE 115-*f* or a combination thereof as described herein with reference to FIGS. 2 and 3.

In some examples, the UE 115-*f* may pause the transmission of the one or more SDTs semi-statically based on the quality of a second set of reference signals (e.g., NCD-SSBs or TRSs) as described herein with reference to FIGS. 2 and 3. In such examples, the UE 115-*f* may pause the transmission of the one or more SDTs based on the measurements of the second set of reference signals being below (e.g., satisfying) a degradation threshold. In such cases, the UE 115-*f* may receive the degradation threshold from the network entity 105-*f*.

In some examples, the UE 115-*f* may pause the transmission of the one or more SDTs in accordance with an indication, from the network entity 105-*f*, to measure the first set of reference signals. Such indication may be based on measurements of the second set of reference signals (e.g., NCD-SSBs or TRSs) as described herein with reference to FIGS. 2 and 3.

At 730, the UE 115-*f* may receive the CD-SSBs via the second BWP in accordance with monitoring the second BWP. At 735, the UE 115-*f* may measure the first set of reference signals. At 740, in accordance with measuring the first set of reference signals, the UE 115-*f* may resume transmission of the one or more SDTs in the first BWP in the inactive mode.

Figure 8:
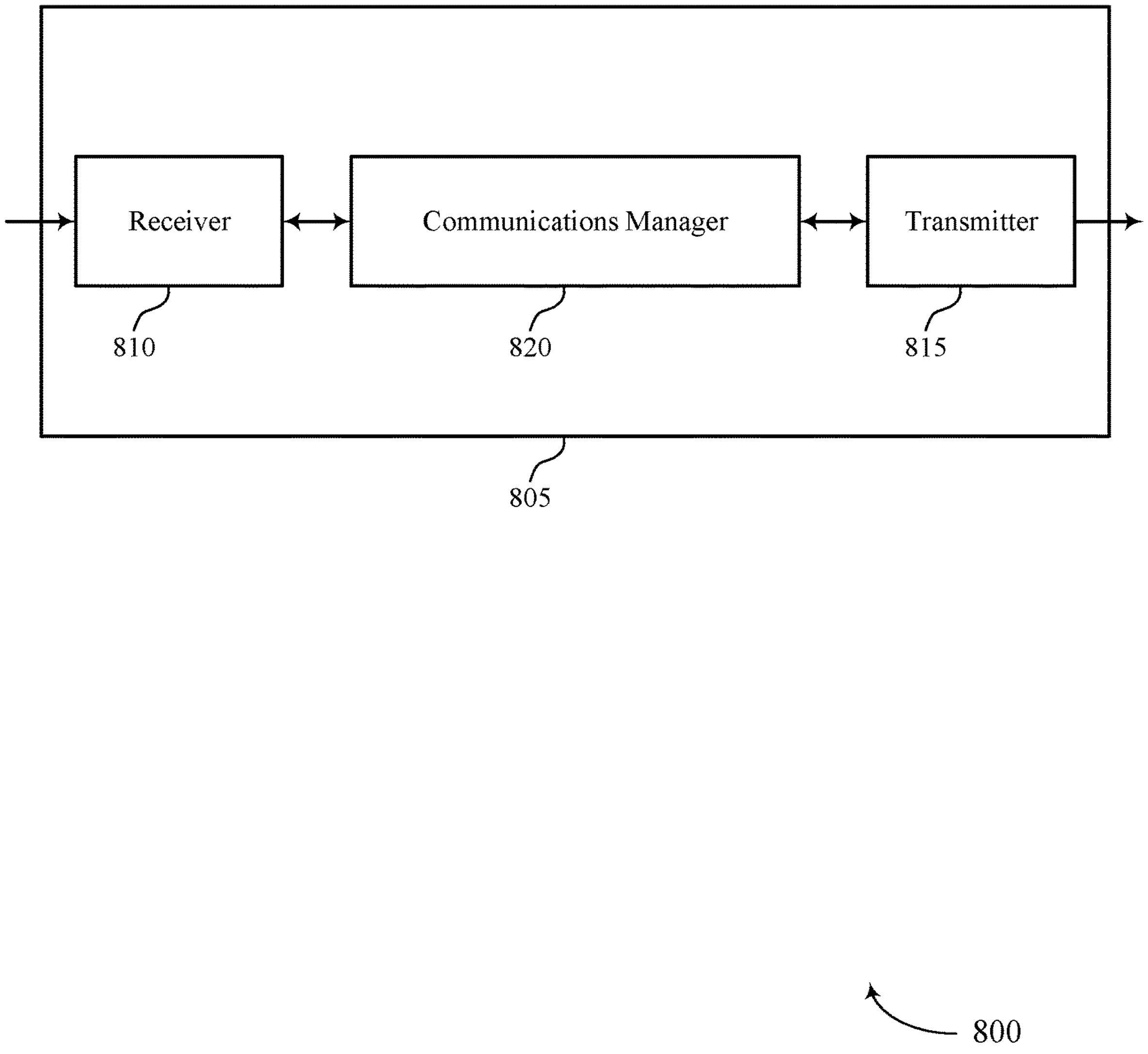
FIGS. 8 and 9 illustrate block diagrams of devices that support techniques for pausing SDTs in accordance with one or more aspects of the present disclosure.

FIG. 8 illustrates a block diagram 800 of a device 805 that supports techniques for pausing SDTs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for pausing SDTs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for pausing SDTs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for pausing SDTs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for transmitting, in an inactive mode, one or more SDTs via a first BWP. The communications manager 820 may be configured as or otherwise support a means for pausing the transmission of the one or more SDTs in the first BWP to monitor a second BWP for a first set of reference signals in the inactive mode. The communications manager 820 may be configured as or otherwise support a means for measuring the first set of reference signals in accordance with monitoring the second BWP in the inactive mode. The communications manager 820 may be configured as or otherwise support a means for resuming the transmission of the one or more SDTs in the first BWP in the inactive mode after measuring the first set of reference signals.

Additionally, or alternatively, the communications manager 820 may support wireless communications at a UE in accordance with examples as disclosed herein. For example, the communications manager 820 may be configured as or otherwise support a means for transmitting, in an inactive mode, one or more SDTs via a first BWP. The communications manager 820 may be configured as or otherwise support a means for receiving, in the inactive mode, a message including an indication of updated system information via the first BWP. The communications manager 820 may be configured as or otherwise support a means for receiving, in the inactive mode, the updated system information in accordance with the message including the indication of the updated system information.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for a UE pausing one or more SDTs to monitor a second BWP, which may be a more efficient utilization of communication resources.

Figure 9:
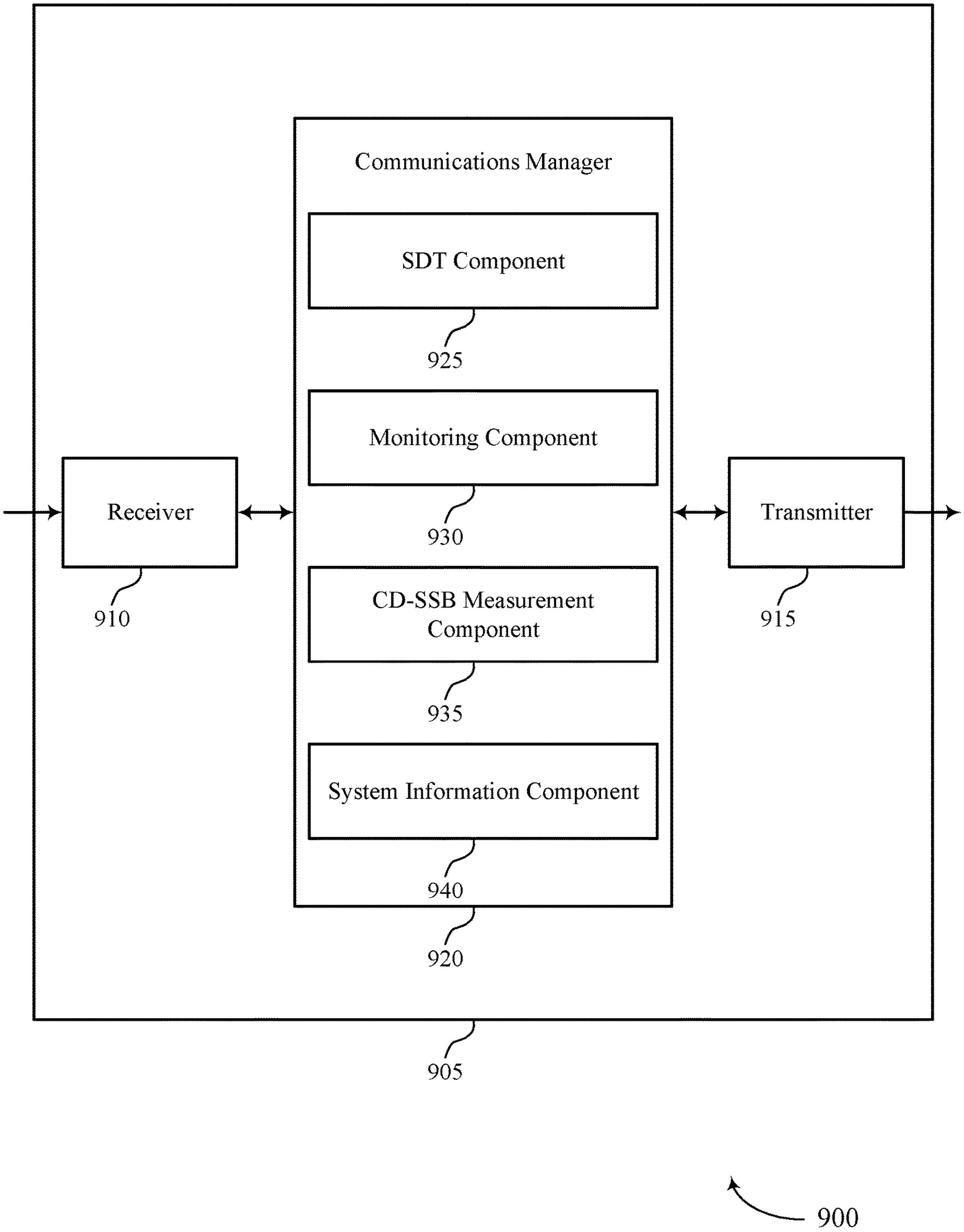

FIG. 9 illustrates a block diagram 900 of a device 905 that supports techniques for pausing SDTs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for pausing SDTs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for pausing SDTs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for pausing SDTs as described herein. For example, the communications manager 920 may include an SDT component 925, a monitoring component 930, a CD-SSB measurement component 935, a system information component 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The SDT component 925 may be configured as or otherwise support a means for transmitting, in an inactive mode, one or more SDTs via a first BWP. The monitoring component 930 may be configured as or otherwise support a means for pausing the transmission of the one or more SDTs in the first BWP to monitor a second BWP for a first set of reference signals in the inactive mode. The CD-SSB measurement component 935 may be configured as or otherwise support a means for measuring the first set of reference signals in accordance with monitoring the second BWP in the inactive mode. The SDT component 925 may be configured as or otherwise support a means for resuming the transmission of the one or more SDTs in the first BWP in the inactive mode after measuring the first set of reference signals.

Additionally, or alternatively, the communications manager 920 may support wireless communications at a UE in accordance with examples as disclosed herein. The SDT component 925 may be configured as or otherwise support a means for transmitting, in an inactive mode, one or more SDTs via a first BWP. The system information component 940 may be configured as or otherwise support a means for receiving, in the inactive mode, a message including an indication of updated system information via the first BWP. The system information component 940 may be configured as or otherwise support a means for receiving, in the inactive mode, the updated system information in accordance with the message including the indication of the updated system information.

Figure 10:
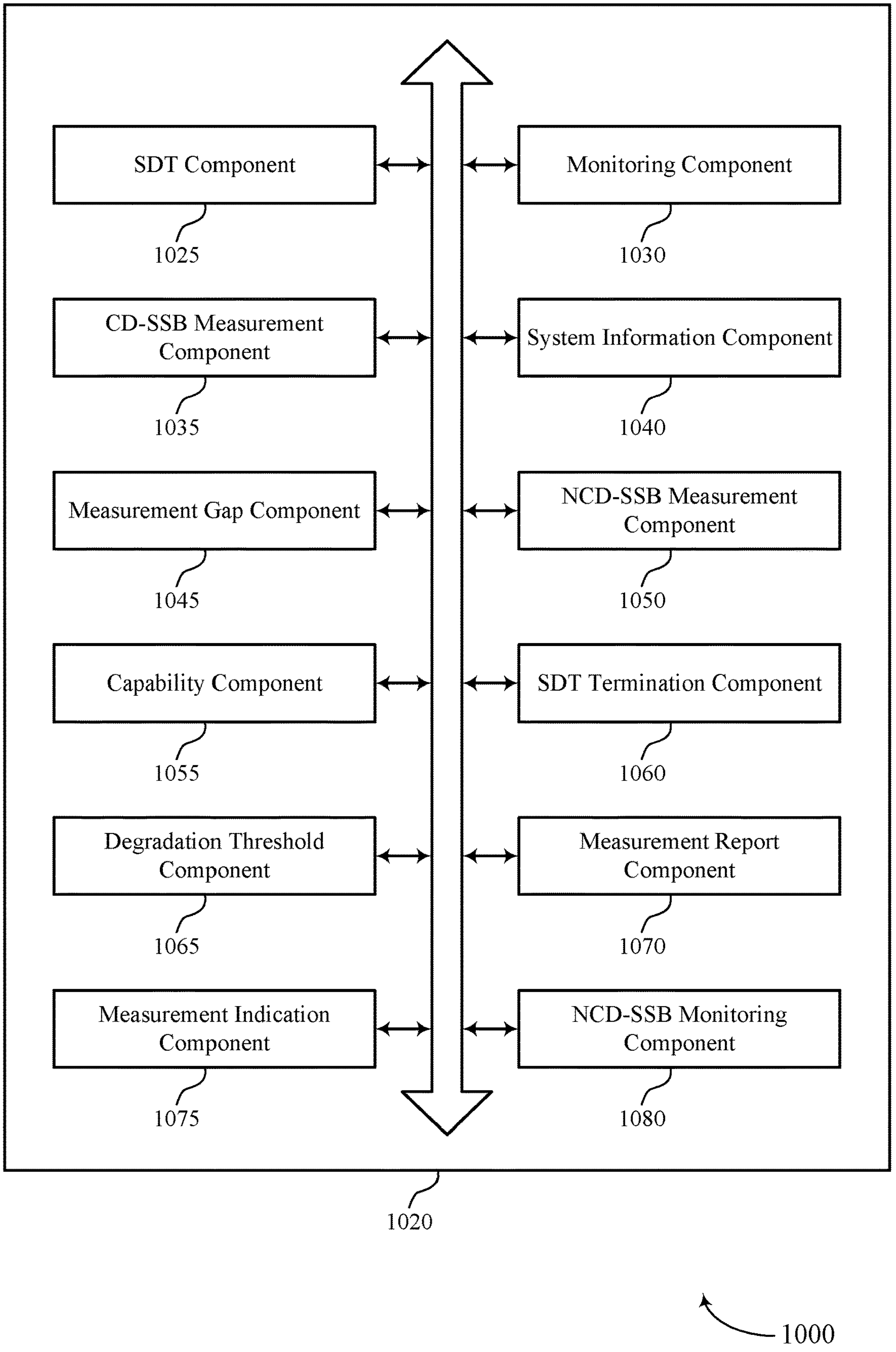
FIG. 10 illustrates a block diagram of a communications manager that supports techniques for pausing SDTs in accordance with one or more aspects of the present disclosure.

FIG. 10 illustrates a block diagram 1000 of a communications manager 1020 that supports techniques for pausing SDTs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for pausing SDTs as described herein. For example, the communications manager 1020 may include an SDT component 1025, a monitoring component 1030, a CD-SSB measurement component 1035, a system information component 1040, a measurement gap component 1045, an NCD-SSB measurement component 1050, a capability component 1055, a SDT termination component 1060, a degradation threshold component 1065, a measurement report component 1070, a measurement indication component 1075, an NCD-SSB monitoring component 1080, or any combination thereof. Each of these components may communicate, directly or indirectly, with one another (e.g., via one or more buses).

The communications manager 1020 may support wireless communications at a UE in accordance with examples as disclosed herein. The SDT component 1025 may be configured as or otherwise support a means for transmitting, in an inactive mode, one or more SDTs via a first BWP. The monitoring component 1030 may be configured as or otherwise support a means for pausing the transmission of the one or more SDTs in the first BWP to monitor a second BWP for a first set of reference signals in the inactive mode. The CD-SSB measurement component 1035 may be configured as or otherwise support a means for measuring the first set of reference signals in accordance with monitoring the second BWP in the inactive mode. In some examples, the SDT component 1025 may be configured as or otherwise support a means for resuming the transmission of the one or more SDTs in the first BWP in the inactive mode after measuring the first set of reference signals.

In some examples, the measurement gap component 1045 may be configured as or otherwise support a means for receiving an indication of a length of a measurement gap for measuring the first set of reference signals and a periodicity of the measurement gap, where pausing the transmission of the one or more SDTs occurs during the measurement gap.

In some examples, pausing the transmission of the one or more SDTs is associated with a discontinuous reception cycle of the UE.

In some examples, pausing the transmission of the one or more SDTs occurs for a duration of time, the duration of time being in accordance with a measurement time for measuring the first set of reference signals and a fixed value.

In some examples, pausing the transmission of the one or more SDTs occurs during a time frame that includes a transmission of the first set of reference signals and a paging occasion of the UE.

In some examples, the NCD-SSB measurement component 1050 may be configured as or otherwise support a means for receiving, via the first BWP, an indication to measure the first set of reference signals, where pausing the transmission of the one or more SDTs is in accordance with the indication.

In some examples, the CD-SSB measurement component 1035 may be configured as or otherwise support a means for measuring a second set of reference signals in the first BWP, where the second set of reference signals are associated with a serving cell.

In some examples, the degradation threshold component 1065 may be configured as or otherwise support a means for receiving a message indicating a degradation threshold, the degradation threshold being associated with the second set of reference signals.

In some examples, pausing the transmission of the one or more SDTs to monitor the second BWP for the first set of reference signals in accordance with measurements of the second set of reference signals satisfying the degradation threshold.

In some examples, the NCD-SSB monitoring component 1080 may be configured as or otherwise support a means for monitoring for the first set of reference signals in the first BWP in accordance with measurements of the second set of reference signals satisfying the degradation threshold.

In some examples, the message is one of a system information message, a MAC-CE message, or a DCI message.

In some examples, the measurement report component 1070 may be configured as or otherwise support a means for transmitting a measurement report indicating measurements of the second set of reference signals. In some examples, the measurement indication component 1075 may be configured as or otherwise support a means for receiving, via the first BWP, an indication to measure the first set of reference signals in accordance with the measurement report, where pausing the transmission of the one or more SDTs is in accordance with the indication.

In some examples, the first set of reference signals include one or more of CD-SSBs and the second set of reference signals include one or more of NCD-SSBs, TRSs, or a combination thereof.

In some examples, the capability component 1055 may be configured as or otherwise support a means for transmitting a capability message indicating a capability of the UE to operate in the first BWP without receiving the first set of reference signals and one or more resources associated with the second BWP, where pausing the transmission of the one or more SDTs is in accordance with the capability of the UE.

In some examples, the UE is a reduced capability UE.

Additionally, or alternatively, the communications manager 1020 may support wireless communications at a UE in accordance with examples as disclosed herein. In some examples, the SDT component 1025 may be configured as or otherwise support a means for transmitting, in an inactive mode, one or more SDTs via a first BWP. The system information component 1040 may be configured as or otherwise support a means for receiving, in the inactive mode, a message including an indication of updated system information via the first BWP. The system information component 1040 may be configured as or otherwise support a means for receiving, in the inactive mode, the updated system information in accordance with the message including the indication of the updated system information.

In some examples, the indication of the updated system information includes the updated system information.

In some examples, the SDT termination component 1060 may be configured as or otherwise support a means for receiving, via the message, an indication to terminate the transmission of the one or more SDTs. In some examples, the monitoring component 1030 may be configured as or otherwise support a means for monitoring a second BWP for the updated system information in accordance with the indication to terminate the transmission of the one or more SDTs.

In some examples, the second BWP includes one or more combinations of a CD-SSB, a core resource set indexed zero, a common core resource set for a serving cell, or a combination thereof.

In some examples, the message is one of a RRC message, a MAC-CE, or a DCI message.

Figure 11:
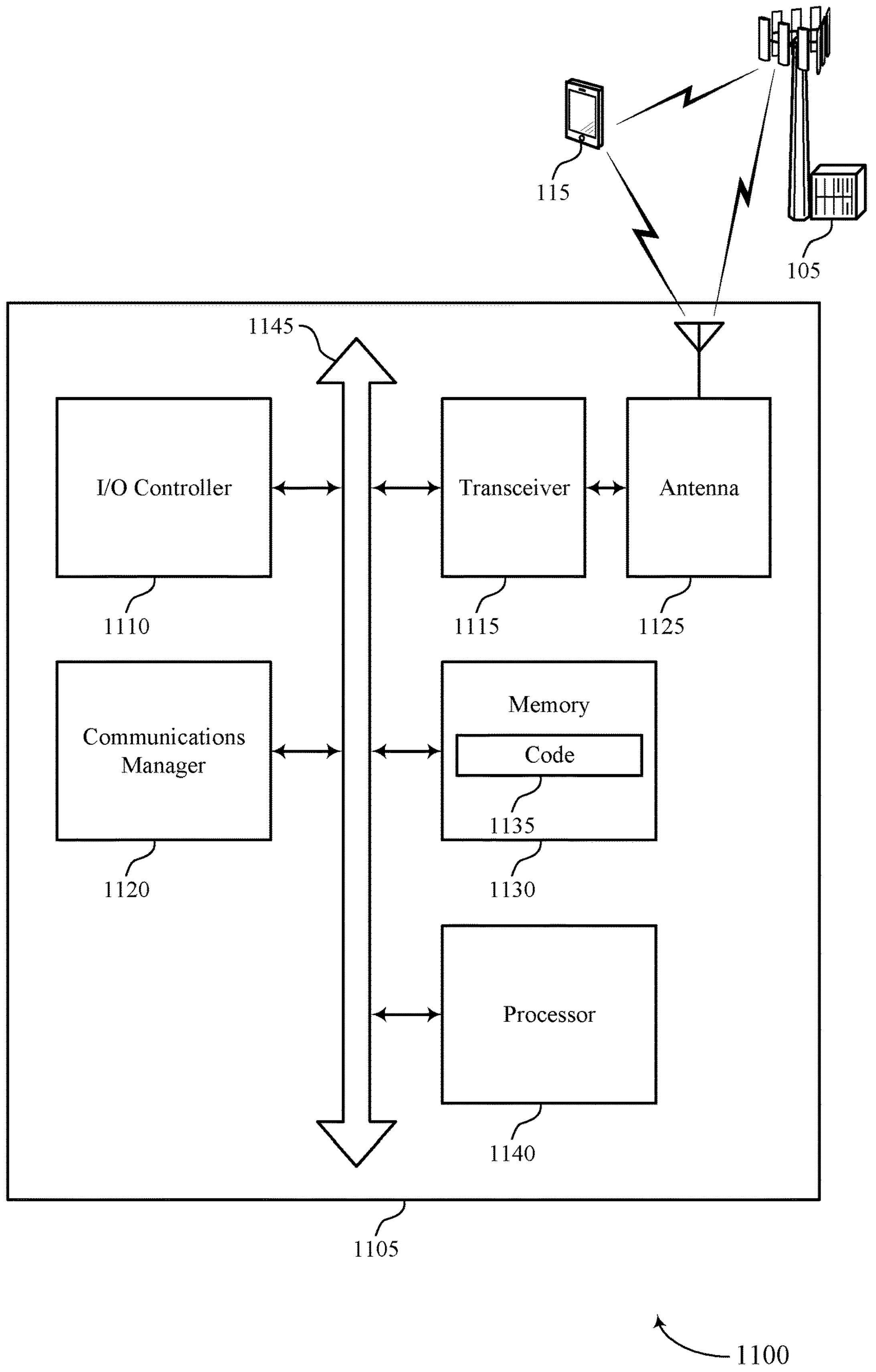
FIG. 11 illustrates a diagram of a system including a device that supports techniques for pausing SDTs in accordance with one or more aspects of the present disclosure.

FIG. 11 illustrates a diagram of a system 1100 including a device 1105 that supports techniques for pausing SDTs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for pausing SDTs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for transmitting, in an inactive mode, one or more SDTs via a first BWP. The communications manager 1120 may be configured as or otherwise support a means for pausing the transmission of the one or more SDTs in the first BWP to monitor a second BWP for a first set of reference signals in the inactive mode. The communications manager 1120 may be configured as or otherwise support a means for measuring the first set of reference signals in accordance with monitoring the second BWP in the inactive mode. The communications manager 1120 may be configured as or otherwise support a means for resuming the transmission of the one or more SDTs in the first BWP in the inactive mode after measuring the first set of reference signals.

Additionally, or alternatively, the communications manager 1120 may support wireless communications at a UE in accordance with examples as disclosed herein. For example, the communications manager 1120 may be configured as or otherwise support a means for transmitting, in an inactive mode, one or more SDTs via a first BWP. The communications manager 1120 may be configured as or otherwise support a means for receiving, in the inactive mode, a message including an indication of updated system information via the first BWP. The communications manager 1120 may be configured as or otherwise support a means for receiving, in the inactive mode, the updated system information in accordance with the message including the indication of the updated system information.

By including or configuring the communications manager 1120 in accordance with examples as described herein, the device 1105 may support techniques for a UE pausing one or more SDTs to monitor a second BWP, which may improve communication reliability and improve coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for pausing SDTs as described herein, or the processor 1140 and the memory 1130 may be otherwise configured to perform or support such operations.

Figure 12:
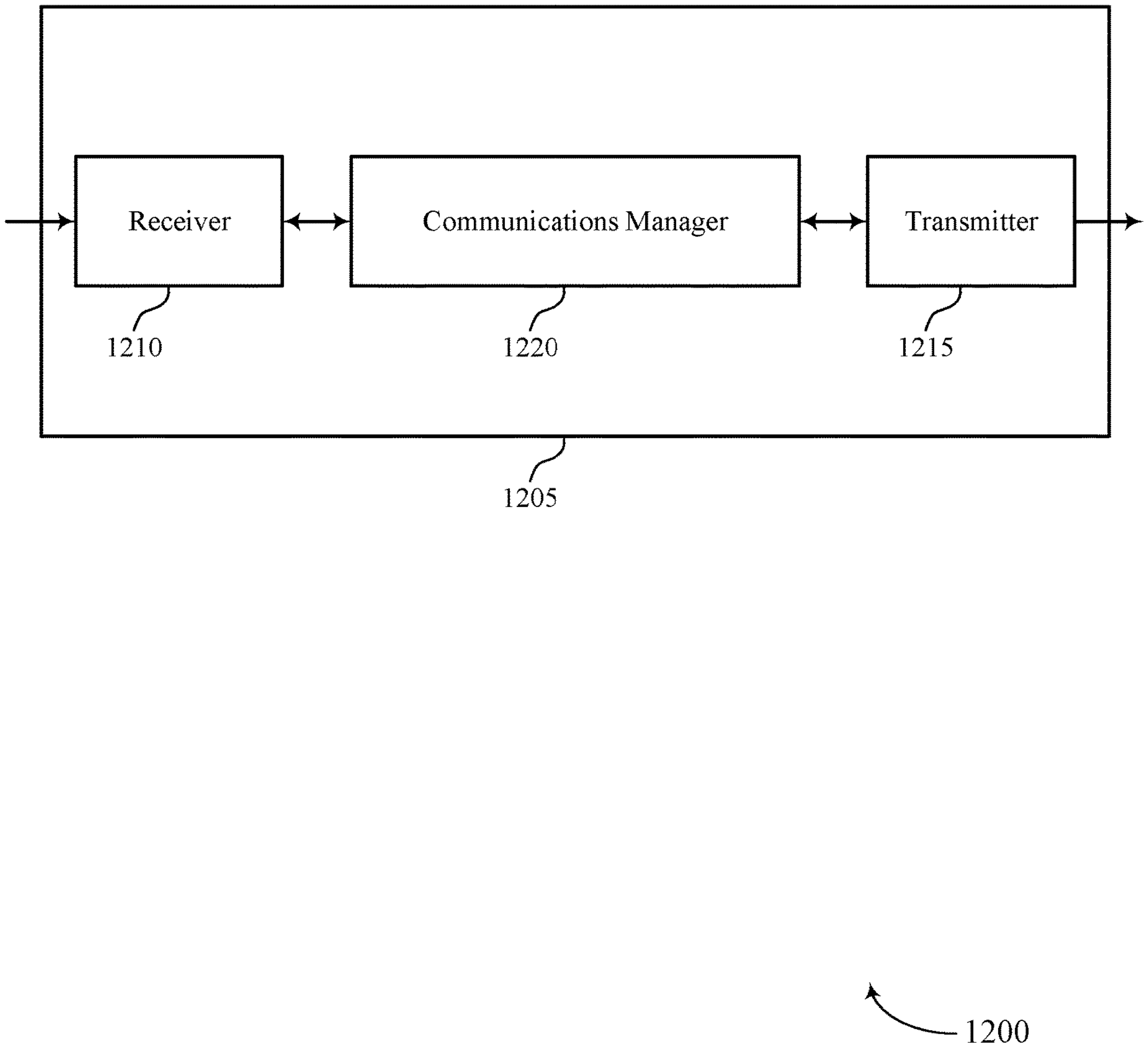
FIGS. 12 and 13 illustrate block diagrams of devices that support techniques for pausing SDTs in accordance with one or more aspects of the present disclosure.

FIG. 12 illustrates a block diagram 1200 of a device 1205 that supports techniques for pausing SDTs in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for pausing SDTs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

For example, the communications manager 1220 may be configured as or otherwise support a means for receiving, from a UE operating in an inactive mode, one or more SDTs via a first BWP. The communications manager 1220 may be configured as or otherwise support a means for pausing the transmission of the one or more SDTs in the first BWP for a duration of time. The communications manager 1220 may be configured as or otherwise support a means for transmitting a first set of reference signals via a second BWP while pausing the transmission of the one or more SDTs in the first BWP. The communications manager 1220 may be configured as or otherwise support a means for resuming the transmission of the one or more SDTs in the first BWP after transmitting the first set of reference signals.

Additionally, or alternatively, the communications manager 1220 may support wireless communications at a network entity in accordance with examples as disclosed herein. For example, the communications manager 1220 may be configured as or otherwise support a means for receiving, from a UE operating in an inactive mode, one or more SDTs via a first BWP. The communications manager 1220 may be configured as or otherwise support a means for transmitting a message including an indication of updated system information via the first BWP. The communications manager 1220 may be configured as or otherwise support a means for transmitting the updated system information in accordance with the message including the indication of the updated system information.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for a UE pausing one or more SDTs to monitor a second BWP, which may be a more efficient utilization of communication resources.

Figure 13:
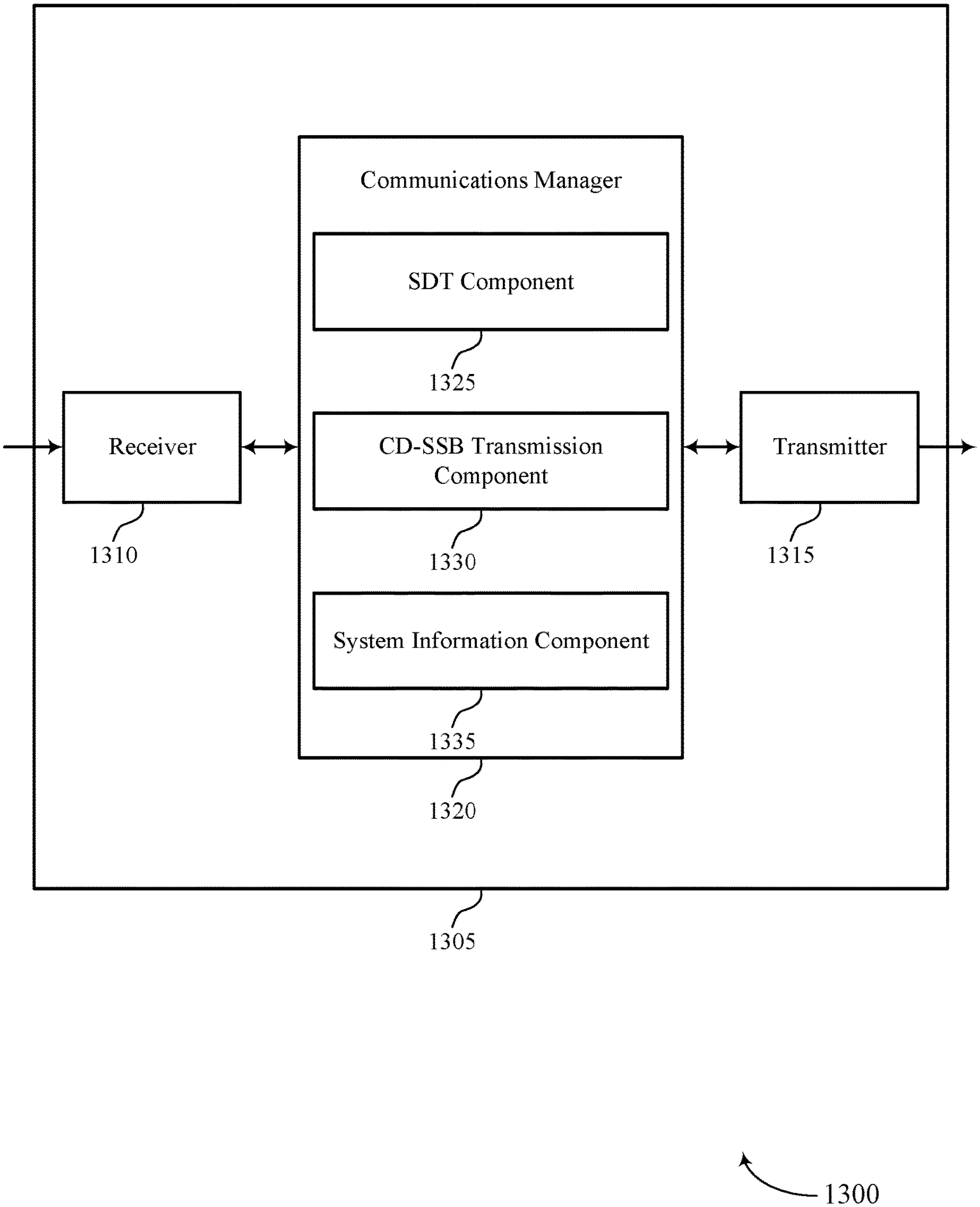

FIG. 13 illustrates a block diagram 1300 of a device 1305 that supports techniques for pausing SDTs in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for pausing SDTs as described herein. For example, the communications manager 1320 may include an SDT component 1325, a CD-SSB transmission component 1330, a system information component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The SDT component 1325 may be configured as or otherwise support a means for receiving, from a UE operating in an inactive mode, one or more SDTs via a first BWP. The SDT component 1325 may be configured as or otherwise support a means for pausing the transmission of the one or more SDTs in the first BWP for a duration of time. The CD-SSB transmission component 1330 may be configured as or otherwise support a means for transmitting a first set of reference signals via a second BWP while pausing the transmission of the one or more SDTs in the first BWP. The SDT component 1325 may be configured as or otherwise support a means for resuming the transmission of the one or more SDTs in the first BWP after transmitting the first set of reference signals.

Additionally, or alternatively, the communications manager 1320 may support wireless communications at a network entity in accordance with examples as disclosed herein. The SDT component 1325 may be configured as or otherwise support a means for receiving, from a UE operating in an inactive mode, one or more SDTs via a first BWP. The system information component 1335 may be configured as or otherwise support a means for transmitting a message including an indication of updated system information via the first BWP. The system information component 1335 may be configured as or otherwise support a means for transmitting the updated system information in accordance with the message including the indication of the updated system information.

Figure 14:
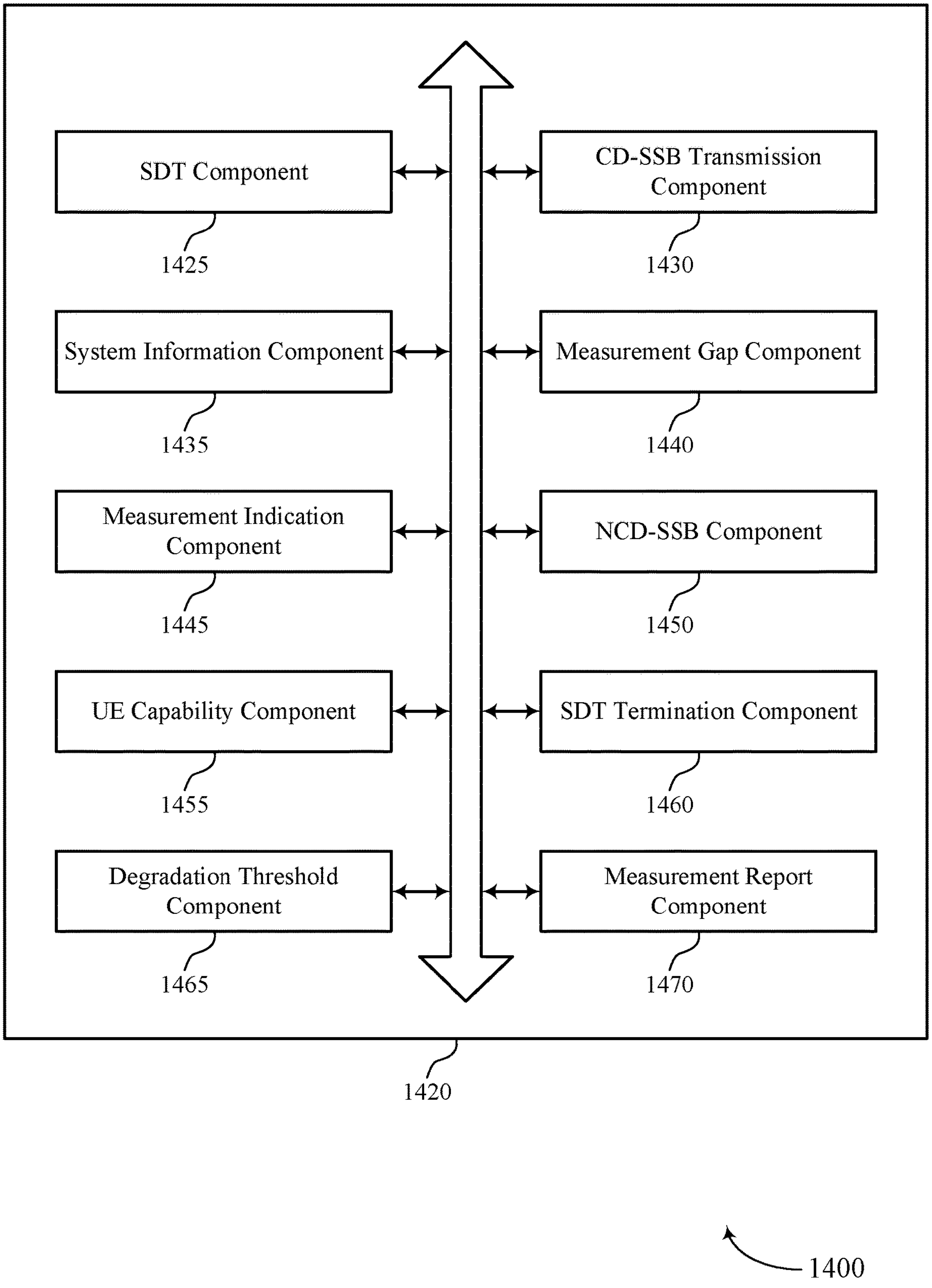
FIG. 14 illustrates a block diagram of a communications manager that supports techniques for pausing SDTs in accordance with one or more aspects of the present disclosure.

FIG. 14 illustrates a block diagram 1400 of a communications manager 1420 that supports techniques for pausing SDTs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for pausing SDTs as described herein. For example, the communications manager 1420 may include an SDT component 1425, a CD-SSB transmission component 1430, a system information component 1435, a measurement gap component 1440, a measurement indication component 1445, an NCD-SSB component 1450, a UE capability component 1455, a SDT termination component 1460, a degradation threshold component 1465, a measurement report component 1470, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The SDT component 1425 may be configured as or otherwise support a means for receiving, from a UE operating in an inactive mode, one or more SDTs via a first BWP. The SDT component 1425 may be configured as or otherwise support a means for pausing the transmission of the one or more SDTs in the first BWP for a duration of time. The CD-SSB transmission component 1430 may be configured as or otherwise support a means for transmitting a first set of reference signals via a second BWP while pausing the transmission of the one or more SDTs in the first BWP. In some examples, the SDT component 1425 may be configured as or otherwise support a means for resuming the transmission of the one or more SDTs in the first BWP after transmitting the first set of reference signals.

In some examples, the measurement gap component 1440 may be configured as or otherwise support a means for transmitting an indication of a length of a measurement gap for the UE to use in measuring the first set of reference signals and a periodicity of the measurement gap, where pausing the transmission of the one or more SDTs occurs during the measurement gap.

In some examples, pausing the transmission of the one or more SDTs is associated with a discontinuous reception cycle of the UE.

In some examples, the duration of time may be in accordance with a measurement time of the UE for measuring the first set of reference signals and a fixed value.

In some examples, pausing the transmission of the one or more SDTs occurs during a time frame that includes a transmission of the first set of reference signals and a paging occasion of the UE.

In some examples, the measurement indication component 1445 may be configured as or otherwise support a means for transmitting, via the first BWP, an indication for the UE to measure the first set of reference signals, where pausing the transmission of the one or more SDTs is in accordance with the indication.

In some examples, the NCD-SSB component 1450 may be configured as or otherwise support a means for transmitting a second set of reference signals in the first BWP, where the second set of reference signals are associated with a serving cell.

In some examples, the degradation threshold component 1465 may be configured as or otherwise support a means for transmitting a message indicating a degradation threshold, the degradation threshold being associated with the second set of reference signals.

In some examples, the message is one of a system information message, a MAC-CE, or a DCI message.

In some examples, the measurement report component 1470 may be configured as or otherwise support a means for receiving a measurement report indicating measurements of the second set of reference signals. In some examples, the measurement indication component 1445 may be configured as or otherwise support a means for transmitting an indication to measure the first set of reference signals in accordance with the measurement report, where pausing the transmission of the one or more SDTs is in accordance with the indication.

In some examples, the first set of reference signals include one or more CD-SSBs and the second set of reference signals include one or more NCD-SSBs, one or more TRSs, or a combination thereof.

In some examples, the UE capability component 1455 may be configured as or otherwise support a means for receiving a capability message indicating a capability of the UE to operate in the first BWP without receiving the first set of reference signals and one or more resources associated with the second BWP, where pausing the transmission of the one or more SDTs is in accordance with the capability of the UE.

In some examples, the UE is a reduced capability UE.

Additionally, or alternatively, the communications manager 1420 may support wireless communications at a network entity in accordance with examples as disclosed herein. In some examples, the SDT component 1425 may be configured as or otherwise support a means for receiving, from a UE operating in an inactive mode, one or more SDTs via a first BWP. The system information component 1435 may be configured as or otherwise support a means for transmitting a message including an indication of updated system information via the first BWP. The system information component 1435 may be configured as or otherwise support a means for transmitting the updated system information in accordance with the message including the indication of the updated system information.

In some examples, the indication of the updated system information includes the updated system information.

In some examples, the SDT termination component 1460 may be configured as or otherwise support a means for transmitting, via the message, an indication to terminate the transmission of the one or more SDTs. In some examples, the system information component 1435 may be configured as or otherwise support a means for transmitting, via a second BWP, the updated system information in accordance with the indication to terminate the transmission of the one or more SDTs.

In some examples, the second BWP includes one or more combinations of a CD-SSB, a core resource set indexed at zero, a common core resource set for a serving cell, or a combination thereof.

In some examples, the message is one of a RRC message, a MAC-CE, or a DCI message.

Figure 15:
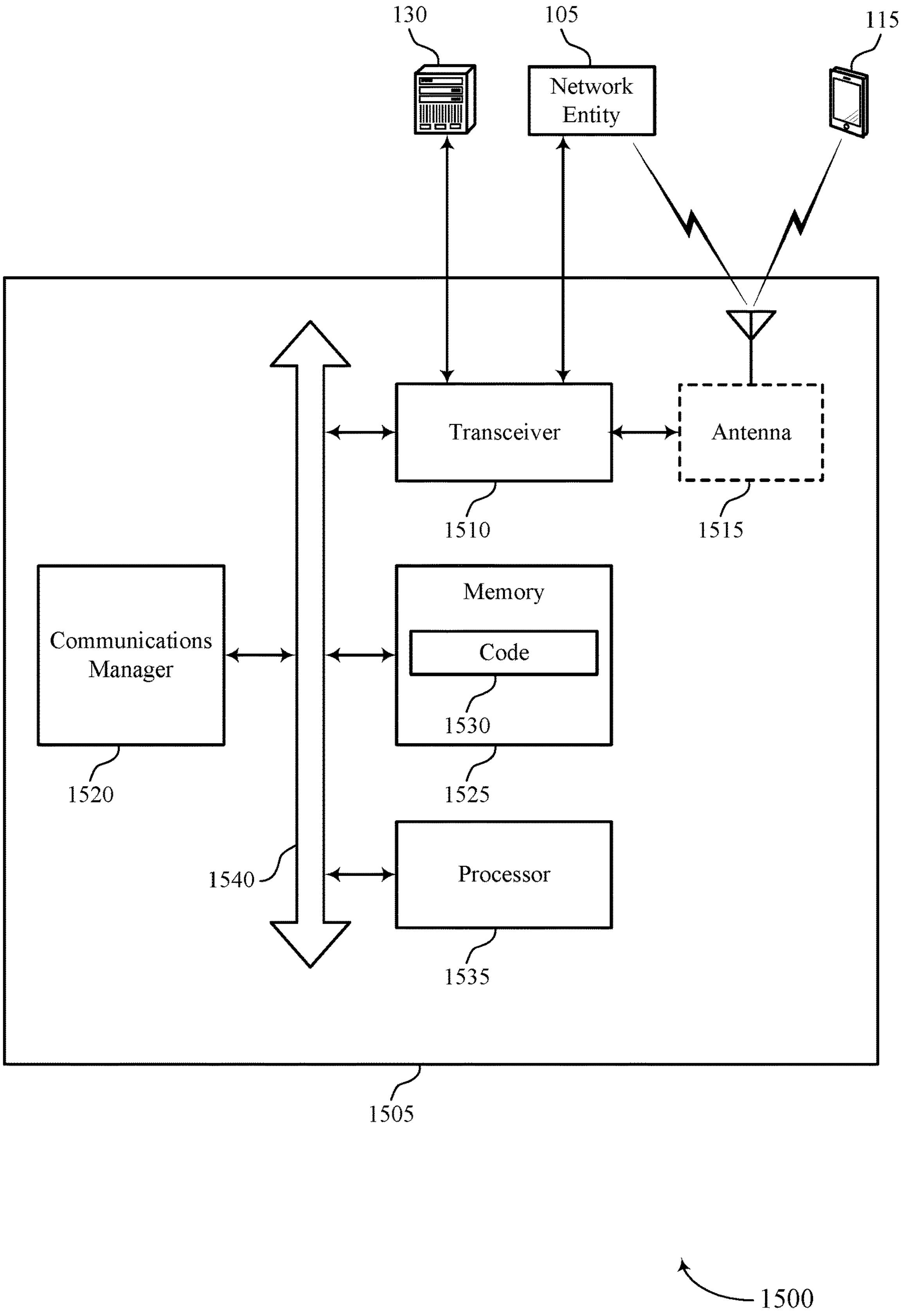
FIG. 15 illustrates a diagram of a system including a device that supports techniques for pausing SDTs in accordance with one or more aspects of the present disclosure.

FIG. 15 illustrates a diagram of a system 1500 including a device 1505 that supports techniques for pausing SDTs in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. In some implementations, the transceiver 1510 may include one or more interfaces, such as one or more interfaces coupled with the one or more antennas 1515 that are configured to support various receiving or obtaining operations, or one or more interfaces coupled with the one or more antennas 1515 that are configured to support various transmitting or outputting operations, or a combination thereof. In some implementations, the transceiver 1510 may include or be configured for coupling with one or more processors or memory components that are operable to perform or support operations based on received or obtained information or signals, or to generate information or other signals for transmission or other outputting, or any combination thereof. In some implementations, the transceiver 1510, or the transceiver 1510 and the one or more antennas 1515, or the transceiver 1510 and the one or more antennas 1515 and one or more processors or memory components (for example, the processor 1535, or the memory 1525, or both), may be included in a chip or chip assembly that is installed in the device 1505. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for pausing SDTs). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505. The processor 1535 may be any one or more suitable processors capable of executing scripts or instructions of one or more software programs stored in the device 1505 (such as within the memory 1525). In some implementations, the processor 1535 may be a component of a processing system. A processing system may generally refer to a system or series of machines or components that receives inputs and processes the inputs to produce a set of outputs (which may be passed to other systems or components of, for example, the device 1505). For example, a processing system of the device 1505 may refer to a system including the various other components or subcomponents of the device 1505, such as the processor 1535, or the transceiver 1510, or the communications manager 1520, or other components or combinations of components of the device 1505. The processing system of the device 1505 may interface with other components of the device 1505, and may process information received from other components (such as inputs or signals) or output information to other components. For example, a chip or modem of the device 1505 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1505 may transmit information output from the chip or modem. Additionally, or alternatively, in some implementations, the one or more interfaces may refer to an interface between the processing system of the chip or modem and a receiver, such that the device 1505 may obtain information or signal inputs, and the information may be passed to the processing system. A person having ordinary skill in the art will readily recognize that a first interface also may obtain information or signal inputs, and a second interface also may output information or signal outputs.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

For example, the communications manager 1520 may be configured as or otherwise support a means for receiving, from a UE operating in an inactive mode, one or more SDTs via a first BWP. The communications manager 1520 may be configured as or otherwise support a means for pausing the transmission of the one or more SDTs in the first BWP for a duration of time. The communications manager 1520 may be configured as or otherwise support a means for transmitting a first set of reference signals via a second BWP while pausing the transmission of the one or more SDTs in the first BWP. The communications manager 1520 may be configured as or otherwise support a means for resuming the transmission of the one or more SDTs in the first BWP after transmitting the first set of reference signals.

Additionally, or alternatively, the communications manager 1520 may support wireless communications at a network entity in accordance with examples as disclosed herein. For example, the communications manager 1520 may be configured as or otherwise support a means for receiving, from a UE operating in an inactive mode, one or more SDTs via a first BWP. The communications manager 1520 may be configured as or otherwise support a means for transmitting a message including an indication of updated system information via the first BWP. The communications manager 1520 may be configured as or otherwise support a means for transmitting the updated system information in accordance with the message including the indication of the updated system information.

By including or configuring the communications manager 1520 in accordance with examples as described herein, the device 1505 may support techniques for a UE pausing one or more SDTs to monitor a second BWP, which may improve communication reliability and improve coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the transceiver 1510, the processor 1535, the memory 1525, the code 1530, or any combination thereof. For example, the code 1530 may include instructions executable by the processor 1535 to cause the device 1505 to perform various aspects of techniques for pausing SDTs as described herein, or the processor 1535 and the memory 1525 may be otherwise configured to perform or support such operations.

Figure 16:
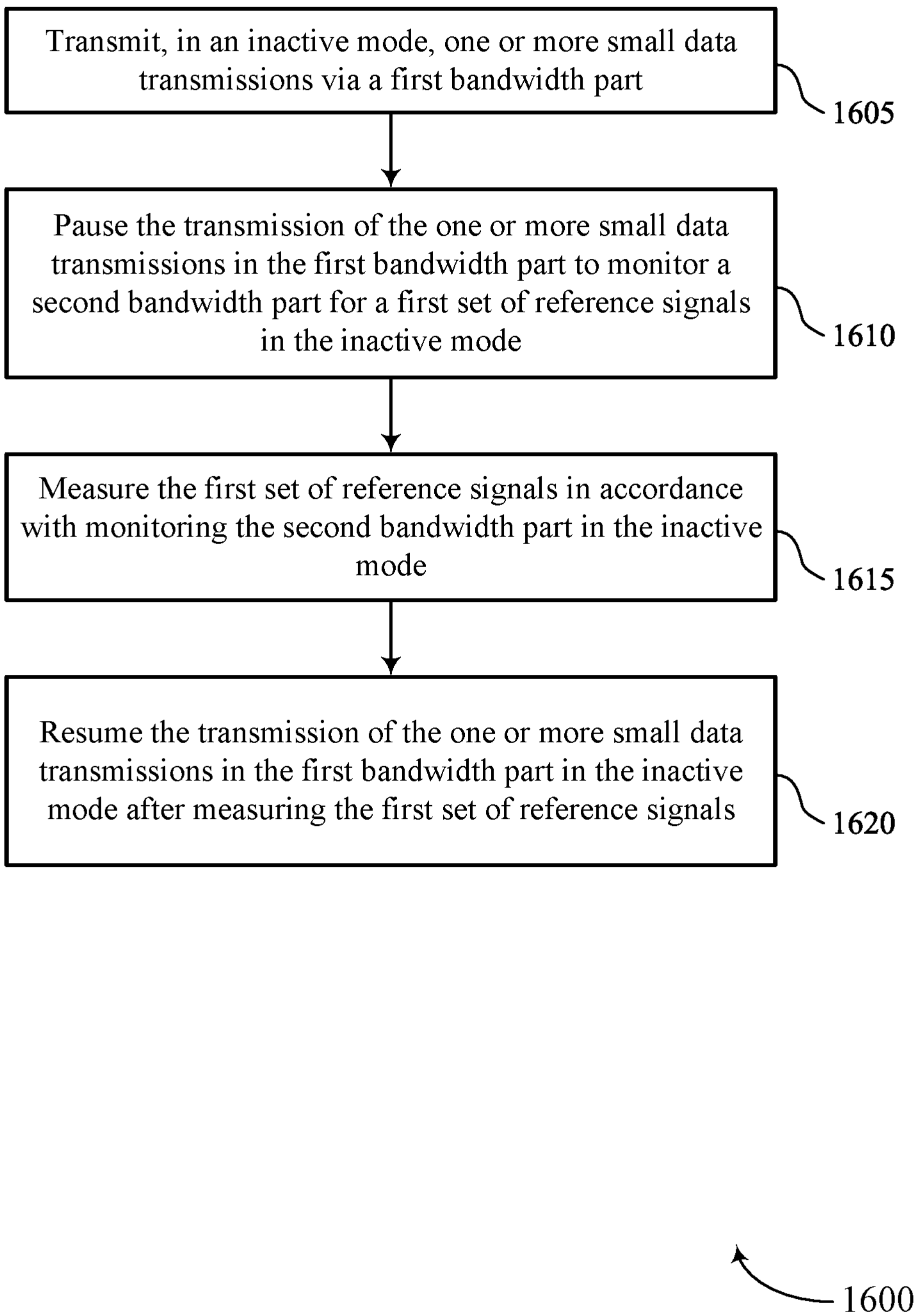
FIGS. 16 through 23 illustrate flowcharts showing methods that support techniques for pausing SDTs in accordance with one or more aspects of the present disclosure.

FIG. 16 illustrates a flowchart showing a method 1600 that supports techniques for pausing SDTs in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting, in an inactive mode, one or more SDTs via a first BWP. The operations of 1605 may be performed in accordance with examples as disclosed herein. In some examples, aspects of the operations of 1605 may be performed by an SDT component 1025 as described with reference to FIG. 10.

At 1610, the method may include pausing the transmission of the one or more SDTs in the first BWP to monitor a second BWP for a first set of reference signals in the inactive mode. The operations of 1610 may be performed in accordance with examples as disclosed herein. In some examples, aspects of the operations of 1610 may be performed by a monitoring component 1030 as described with reference to FIG. 10.

At 1615, the method may include measuring the first set of reference signals in accordance with monitoring the second BWP in the inactive mode. The operations of 1615 may be performed in accordance with examples as disclosed herein. In some examples, aspects of the operations of 1615 may be performed by a CD-SSB measurement component 1035 as described with reference to FIG. 10.

At 1620, the method may include resuming the transmission of the one or more SDTs in the first BWP in the inactive mode after measuring the first set of reference signals. The operations of 1620 may be performed in accordance with examples as disclosed herein. In some examples, aspects of the operations of 1620 may be performed by an SDT component 1025 as described with reference to FIG. 10.

Figure 17:
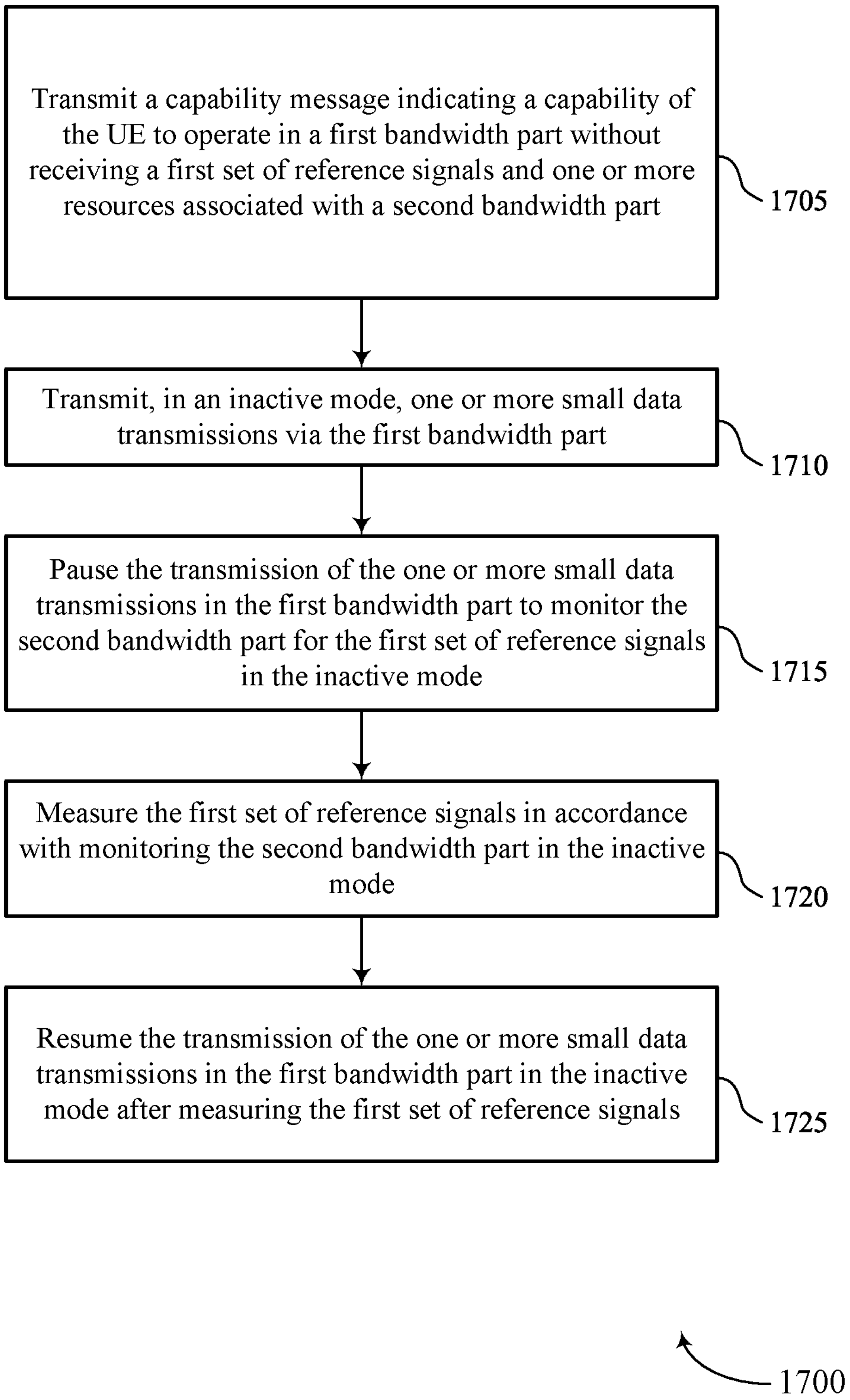

FIG. 17 illustrates a flowchart showing a method 1700 that supports techniques for pausing SDTs in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting a capability message indicating a capability of the UE to operate in a first BWP without receiving a first set of reference signals and one or more resources associated with a second BWP. The operations of 1705 may be performed in accordance with examples as disclosed herein. In some examples, aspects of the operations of 1705 may be performed by a capability component 1055 as described with reference to FIG. 10.

At 1710, the method may include transmitting, in an inactive mode, one or more SDTs via the first BWP. The operations of 1710 may be performed in accordance with examples as disclosed herein. In some examples, aspects of the operations of 1710 may be performed by an SDT component 1025 as described with reference to FIG. 10.

At 1715, the method may include pausing the transmission of the one or more SDTs in the first BWP to monitor the second BWP for the first set of reference signals in the inactive mode. The operations of 1715 may be performed in accordance with examples as disclosed herein. In some examples, aspects of the operations of 1715 may be performed by a monitoring component 1030 as described with reference to FIG. 10.

At 1720, the method may include measuring the first set of reference signals in accordance with monitoring the second BWP in the inactive mode. The operations of 1720 may be performed in accordance with examples as disclosed herein. In some examples, aspects of the operations of 1720 may be performed by a CD-SSB measurement component 1035 as described with reference to FIG. 10.

At 1725, the method may include resuming the transmission of the one or more SDTs in the first BWP in the inactive mode after measuring the first set of reference signals. The operations of 1725 may be performed in accordance with examples as disclosed herein. In some examples, aspects of the operations of 1725 may be performed by an SDT component 1025 as described with reference to FIG. 10.

Figure 18:
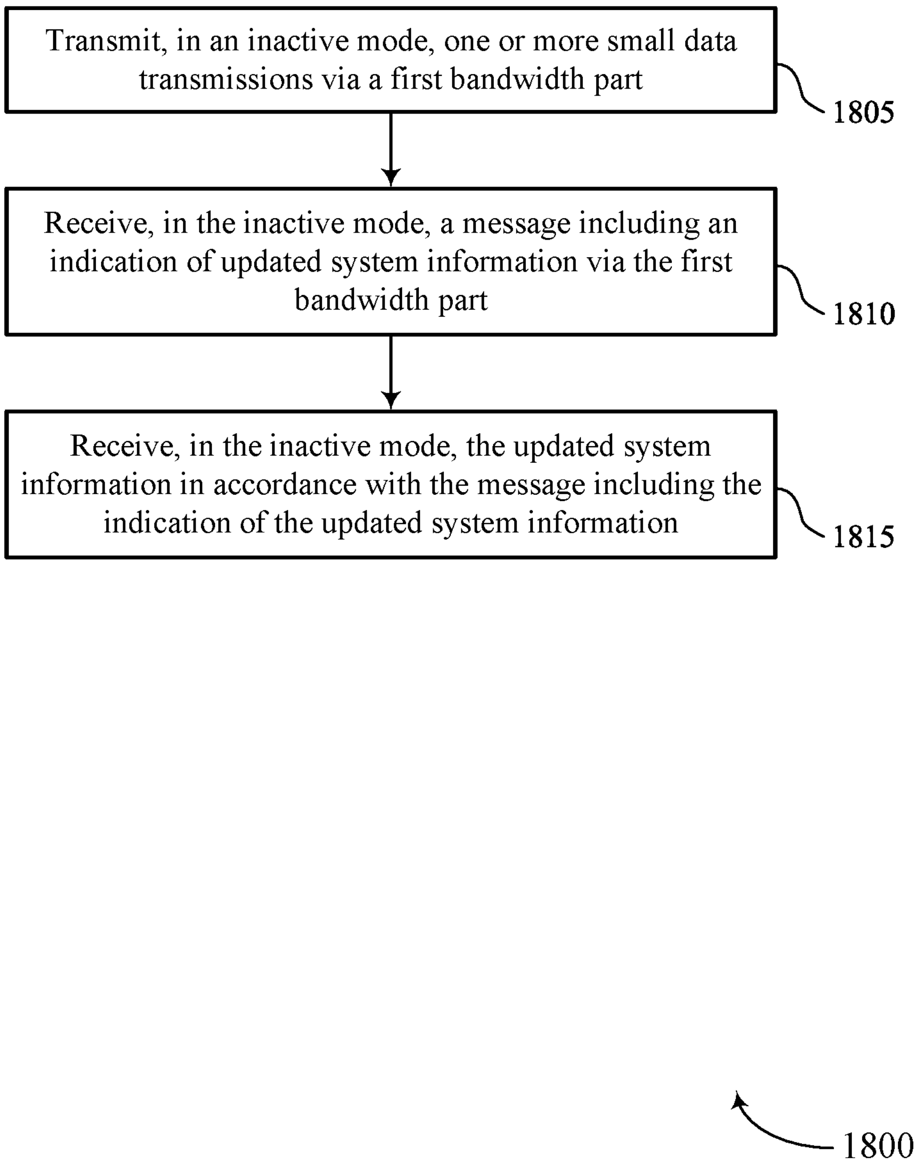

FIG. 18 illustrates a flowchart showing a method 1800 that supports techniques for pausing SDTs in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include transmitting, in an inactive mode, one or more SDTs via a first BWP. The operations of 1805 may be performed in accordance with examples as disclosed herein. In some examples, aspects of the operations of 1805 may be performed by an SDT component 1025 as described with reference to FIG. 10.

At 1810, the method may include receiving, in the inactive mode, a message including an indication of updated system information via the first BWP. The operations of 1810 may be performed in accordance with examples as disclosed herein. In some examples, aspects of the operations of 1810 may be performed by a system information component 1040 as described with reference to FIG. 10.

At 1815, the method may include receiving, in the inactive mode, the updated system information in accordance with the message including the indication of the updated system information. The operations of 1815 may be performed in accordance with examples as disclosed herein. In some examples, aspects of the operations of 1815 may be performed by a system information component 1040 as described with reference to FIG. 10.

Figure 19:
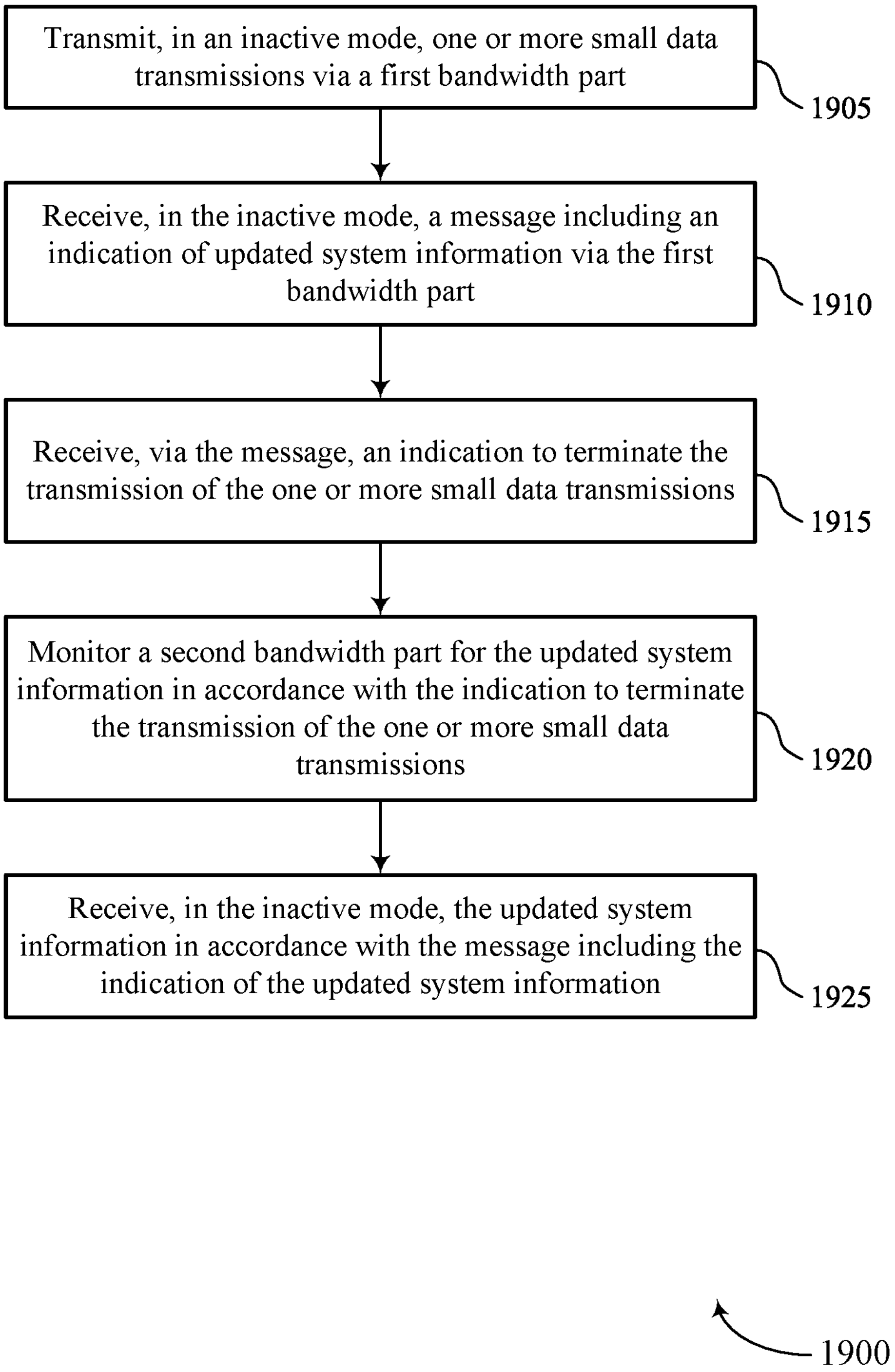

FIG. 19 illustrates a flowchart showing a method 1900 that supports techniques for pausing SDTs in accordance with one or more aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include transmitting, in an inactive mode, one or more SDTs via a first BWP. The operations of 1905 may be performed in accordance with examples as disclosed herein. In some examples, aspects of the operations of 1905 may be performed by an SDT component 1025 as described with reference to FIG. 10.

At 1910, the method may include receiving, in the inactive mode, a message including an indication of updated system information via the first BWP. The operations of 1910 may be performed in accordance with examples as disclosed herein. In some examples, aspects of the operations of 1910 may be performed by a system information component 1040 as described with reference to FIG. 10.

At 1915, the method may include receiving, via the message, an indication to terminate the transmission of the one or more SDTs. The operations of 1915 may be performed in accordance with examples as disclosed herein. In some examples, aspects of the operations of 1915 may be performed by a SDT termination component 1060 as described with reference to FIG. 10.

At 1920, the method may include monitoring a second BWP for the updated system information in accordance with the indication to terminate the transmission of the one or more SDTs. The operations of 1920 may be performed in accordance with examples as disclosed herein. In some examples, aspects of the operations of 1920 may be performed by a monitoring component 1030 as described with reference to FIG. 10.

At 1925, the method may include receiving, in the inactive mode, the updated system information in accordance with the message including the indication of the updated system information. The operations of 1925 may be performed in accordance with examples as disclosed herein. In some examples, aspects of the operations of 1925 may be performed by a system information component 1040 as described with reference to FIG. 10.

Figure 20:
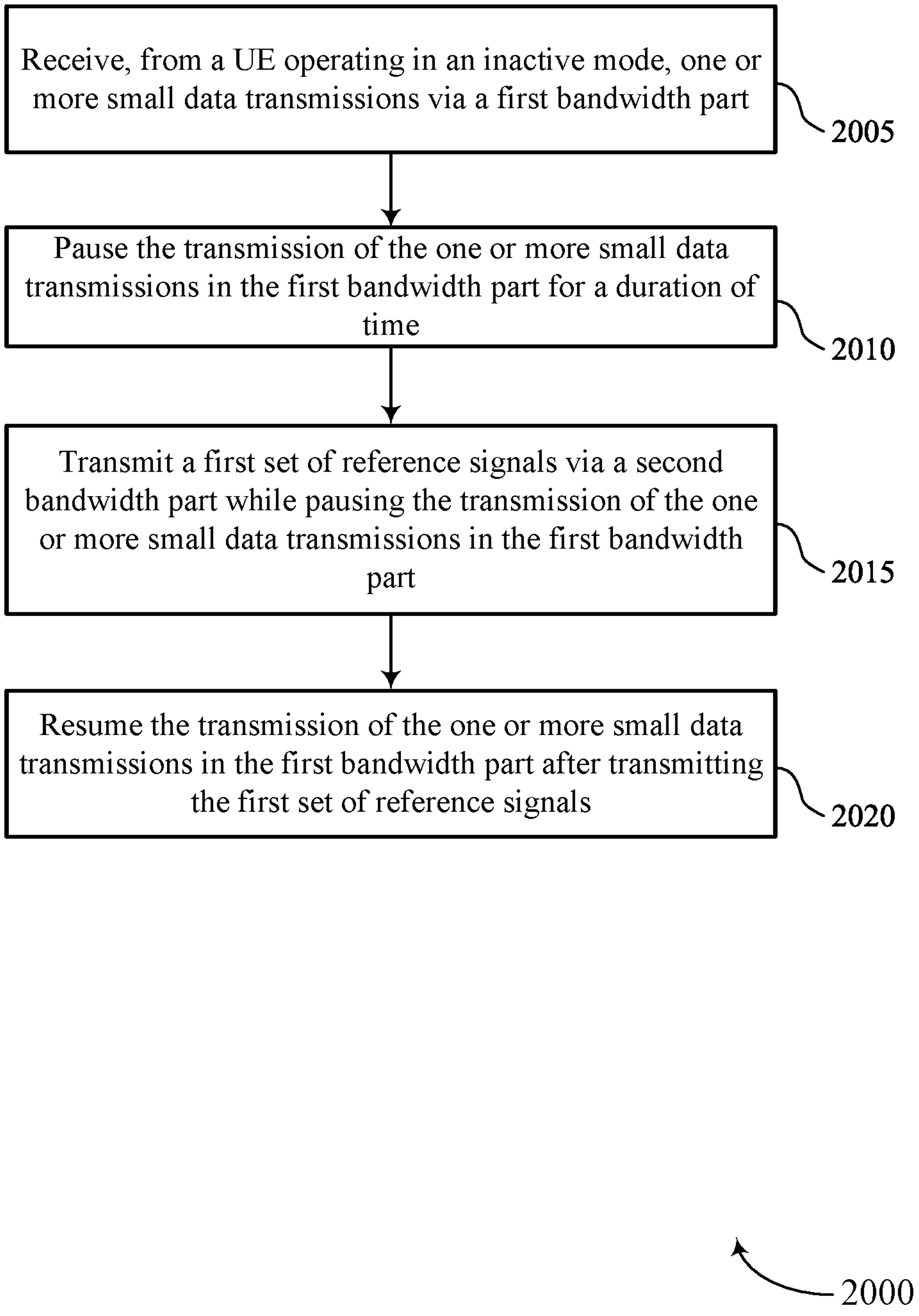

FIG. 20 illustrates a flowchart showing a method 2000 that supports techniques for pausing SDTs in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include receiving, from a UE operating in an inactive mode, one or more SDTs via a first BWP. The operations of 2005 may be performed in accordance with examples as disclosed herein. In some examples, aspects of the operations of 2005 may be performed by an SDT component 1425 as described with reference to FIG. 14.

At 2010, the method may include pausing the transmission of the one or more SDTs in the first BWP for a duration of time. The operations of 2010 may be performed in accordance with examples as disclosed herein. In some examples, aspects of the operations of 2010 may be performed by a SDT component 1425 as described with reference to FIG. 14.

At 2015, the method may include transmitting a first set of reference signals via a second BWP while pausing the transmission of the one or more SDTs in the first BWP. The operations of 2015 may be performed in accordance with examples as disclosed herein. In some examples, aspects of the operations of 2015 may be performed by a CD-SSB transmission component 1430 as described with reference to FIG. 14.

At 2020, the method may include resuming the transmission of the one or more SDTs in the first BWP after transmitting the first set of reference signals. The operations of 2020 may be performed in accordance with examples as disclosed herein. In some examples, aspects of the operations of 2020 may be performed by an SDT component 1425 as described with reference to FIG. 14.

Figure 21:
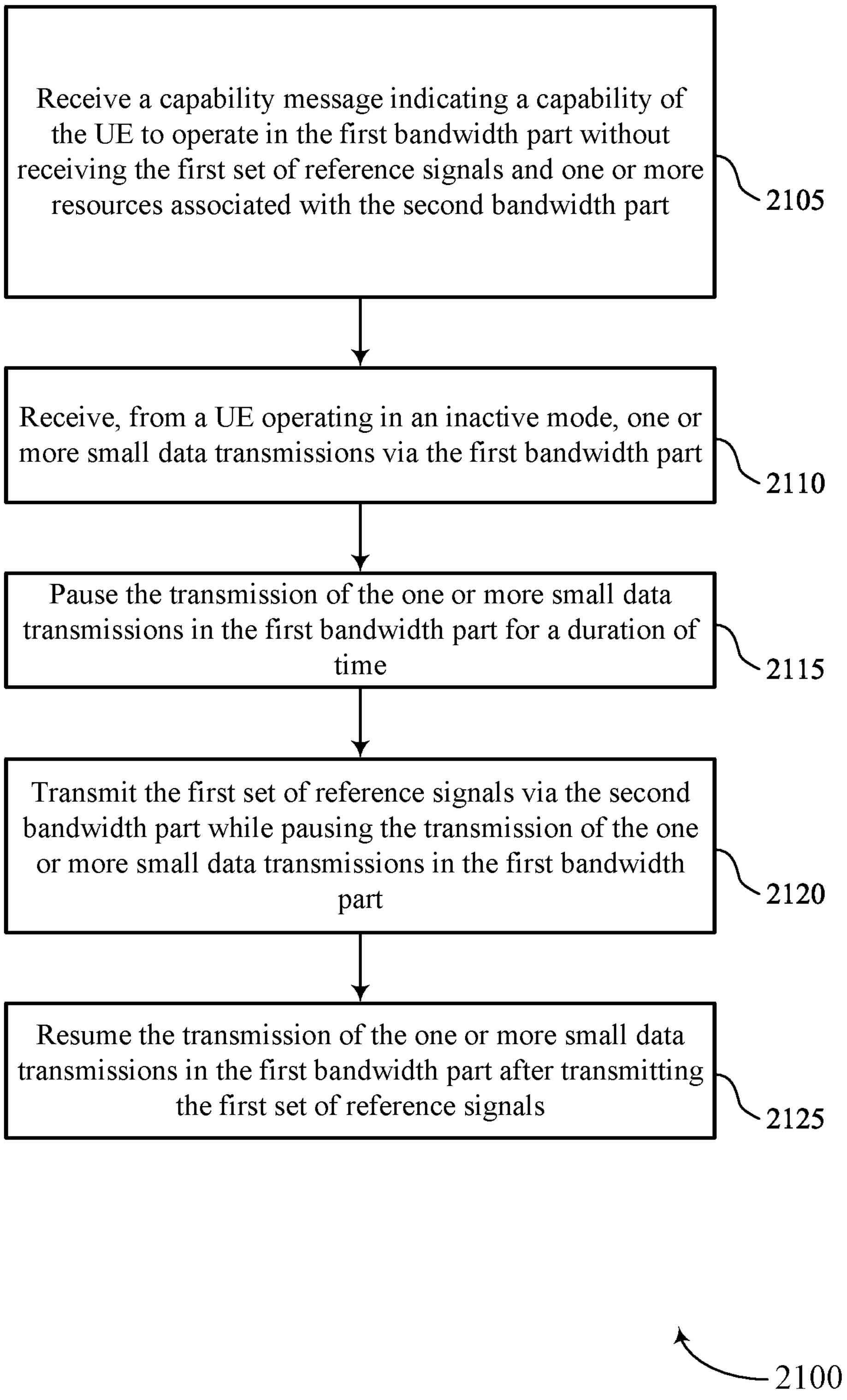

FIG. 21 illustrates a flowchart showing a method 2100 that supports techniques for pausing SDTs in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include receiving a capability message indicating a capability of the UE to operate in a first BWP without receiving a first set of reference signals and one or more resources associated with a second BWP. The operations of 2105 may be performed in accordance with examples as disclosed herein. In some examples, aspects of the operations of 2105 may be performed by a UE capability component 1455 as described with reference to FIG. 14.

At 2110, the method may include receiving, from a UE operating in an inactive mode, one or more SDTs via the first BWP. The operations of 2110 may be performed in accordance with examples as disclosed herein. In some examples, aspects of the operations of 2110 may be performed by an SDT component 1425 as described with reference to FIG. 14.

At 2115, the method may include pausing the transmission of the one or more SDTs in the first BWP for a duration of time. The operations of 2115 may be performed in accordance with examples as disclosed herein. In some examples, aspects of the operations of 2115 may be performed by a SDT component 1425 as described with reference to FIG. 14.

At 2120, the method may include transmitting the first set of reference signals via the second BWP while pausing the transmission of the one or more SDTs in the first BWP. The operations of 2120 may be performed in accordance with examples as disclosed herein. In some examples, aspects of the operations of 2120 may be performed by a CD-SSB transmission component 1430 as described with reference to FIG. 14.

At 2125, the method may include resuming the transmission of the one or more SDTs in the first BWP after transmitting the first set of reference signals. The operations of 2125 may be performed in accordance with examples as disclosed herein. In some examples, aspects of the operations of 2125 may be performed by an SDT component 1425 as described with reference to FIG. 14.

Figure 22:
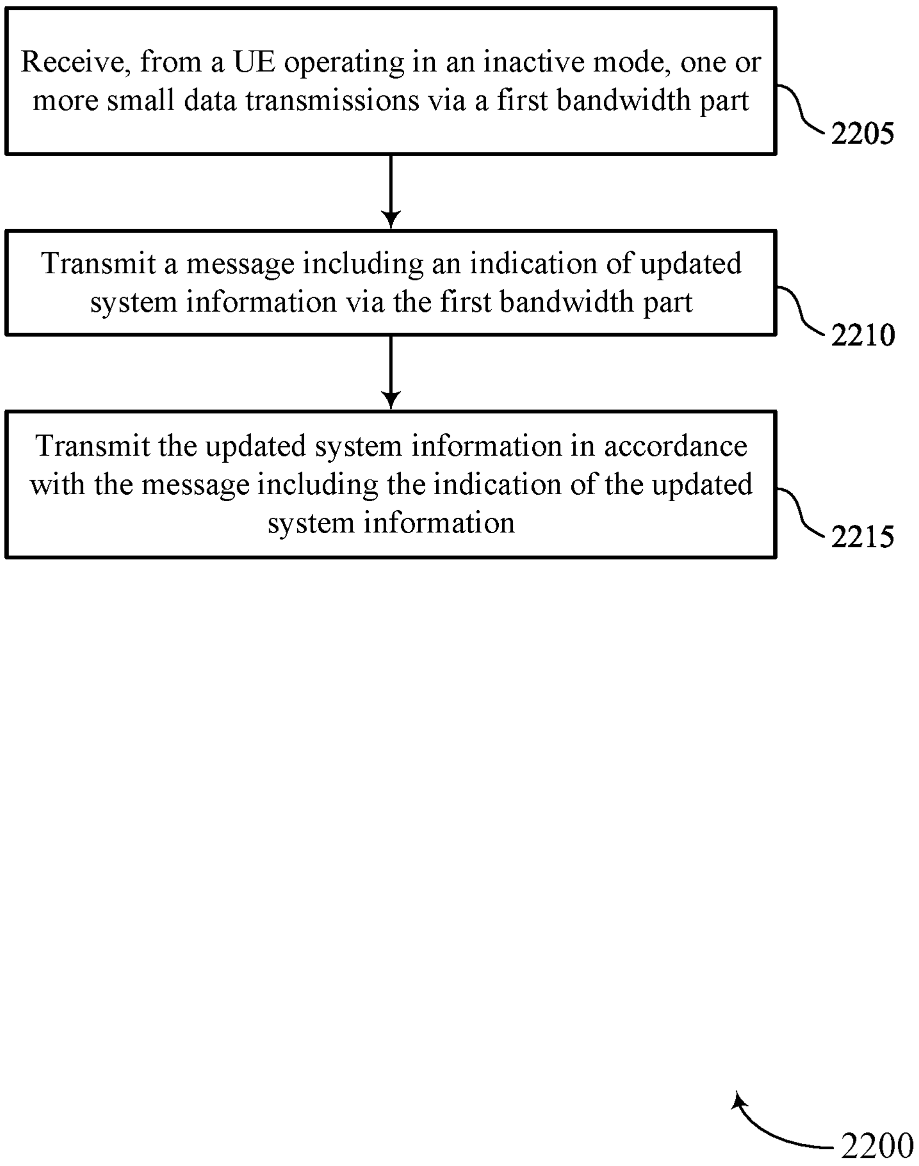

FIG. 22 illustrates a flowchart showing a method 2200 that supports techniques for pausing SDTs in accordance with one or more aspects of the present disclosure. The operations of the method 2200 may be implemented by a network entity or its components as described herein. For example, the operations of the method 2200 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2205, the method may include receiving, from a UE operating in an inactive mode, one or more SDTs via a first BWP. The operations of 2205 may be performed in accordance with examples as disclosed herein. In some examples, aspects of the operations of 2205 may be performed by an SDT component 1425 as described with reference to FIG. 14.

At 2210, the method may include transmitting a message including an indication of updated system information via the first BWP. The operations of 2210 may be performed in accordance with examples as disclosed herein. In some examples, aspects of the operations of 2210 may be performed by a system information component 1435 as described with reference to FIG. 14.

At 2215, the method may include transmitting the updated system information in accordance with the message including the indication of the updated system information. The operations of 2215 may be performed in accordance with examples as disclosed herein. In some examples, aspects of the operations of 2215 may be performed by a system information component 1435 as described with reference to FIG. 14.

Figure 23:
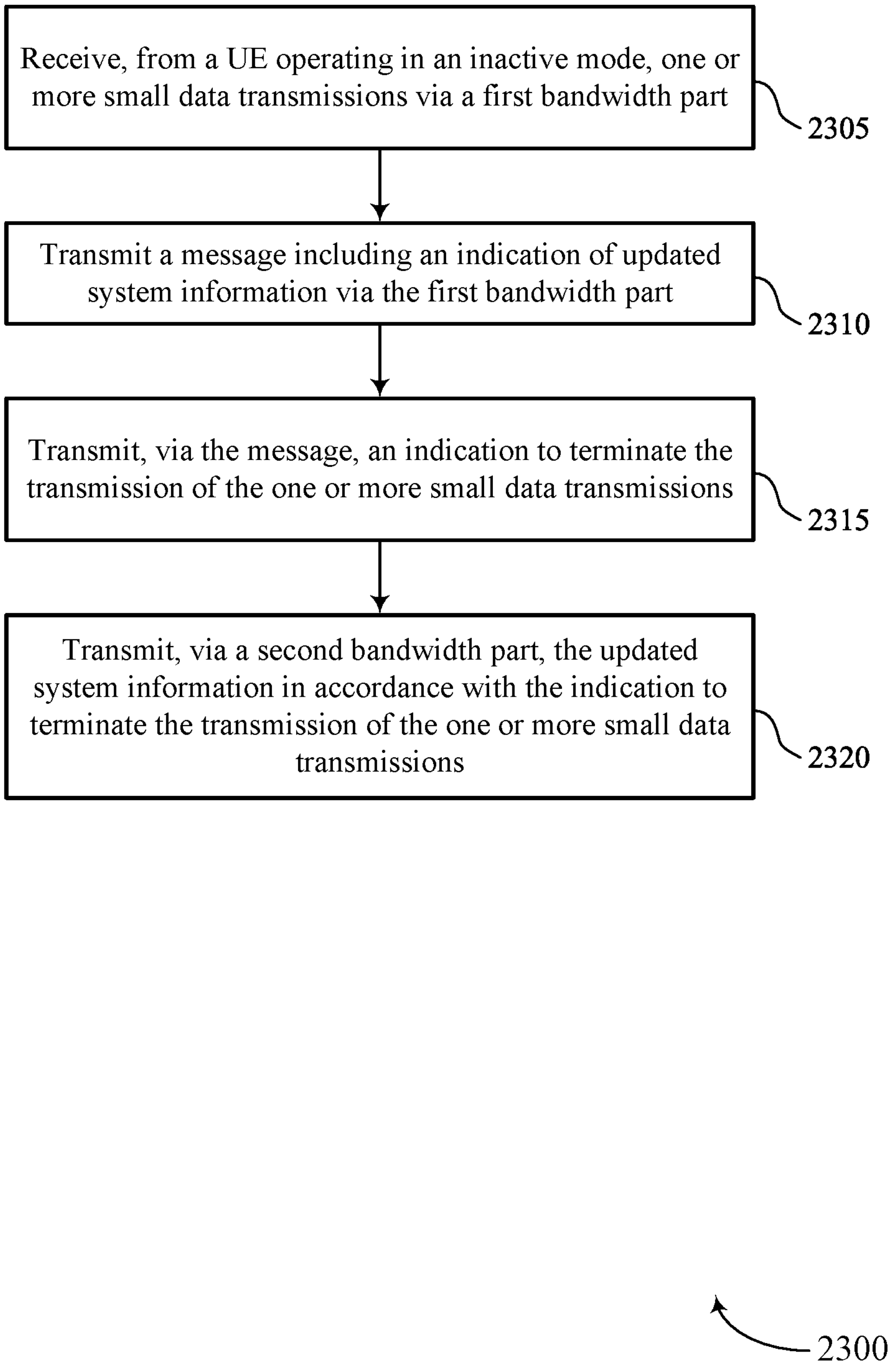

FIG. 23 illustrates a flowchart showing a method 2300 that supports techniques for pausing SDTs in accordance with one or more aspects of the present disclosure. The operations of the method 2300 may be implemented by a network entity or its components as described herein. For example, the operations of the method 2300 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2305, the method may include receiving, from a UE operating in an inactive mode, one or more SDTs via a first BWP. The operations of 2305 may be performed in accordance with examples as disclosed herein. In some examples, aspects of the operations of 2305 may be performed by an SDT component 1425 as described with reference to FIG. 14.

At 2310, the method may include transmitting a message including an indication of updated system information via the first BWP. The operations of 2310 may be performed in accordance with examples as disclosed herein. In some examples, aspects of the operations of 2310 may be performed by a system information component 1435 as described with reference to FIG. 14.

At 2315, the method may include transmitting, via the message, an indication to terminate the transmission of the one or more SDTs. The operations of 2315 may be performed in accordance with examples as disclosed herein. In some examples, aspects of the operations of 2315 may be performed by a SDT termination component 1460 as described with reference to FIG. 14.

At 2320, the method may include transmitting, via a second BWP, the updated system information in accordance with the indication to terminate the transmission of the one or more SDTs. The operations of 2320 may be performed in accordance with examples as disclosed herein. In some examples, aspects of the operations of 2320 may be performed by a system information component 1435 as described with reference to FIG. 14.

The following provides an overview of aspects of the present disclosure:

Aspect 1: A method for wireless communications at a UE, comprising: transmitting, in an inactive mode, one or more SDTs via a first BWP; pausing the transmission of the one or more SDTs in the first BWP to monitor a second BWP for a first set of reference signals in the inactive mode; measuring the first set of reference signals in accordance with monitoring the second BWP in the inactive mode; and resuming the transmission of the one or more SDTs in the first BWP in the inactive mode after measuring the first set of reference signals.

Aspect 2: The method of aspect 1, further comprising: receiving an indication of a length of a measurement gap for measuring the first set of reference signals and a periodicity of the measurement gap, wherein pausing the transmission of the one or more SDTs occurs during the measurement gap.

Aspect 3: The method of aspect 1, wherein pausing the transmission of the one or more SDTs is associated with a DRX of the UE.

Aspect 4: The method of any of aspects 1 through 3, wherein pausing the transmission of the one or more SDTs occurs for a duration of time, the duration of time being in accordance with a measurement time for measuring the first set of reference signals and a fixed value.

Aspect 5: The method of aspect 1, wherein pausing the transmission of the one or more SDTs occurs during a time frame that includes a transmission of the first set of reference signals and a paging occasion of the UE.

Aspect 6: The method of any of aspects 1 through 5, further comprising: receiving, via the first BWP, an indication to measure the first set of reference signals, wherein pausing the transmission of the one or more SDTs is in accordance with the indication.

Aspect 7: The method of any of aspects 1 through 6, further comprising: measuring a second set of reference signals in the first BWP, wherein the second set of reference signals are associated with a serving cell.

Aspect 8: The method of aspect 7, further comprising: receiving a message indicating a degradation threshold, the degradation threshold being associated with the second set of reference signals.

Aspect 9: The method of aspect 8, wherein pausing the transmission of the one or more SDTs to monitor the second BWP for the first set of reference signals in accordance with measurements of the second set of reference signals satisfying the degradation threshold.

Aspect 10: The method of any of aspects 8 through 9, further comprising: monitoring for the first set of reference signals in the first BWP in accordance with measurements of the second set of reference signals satisfying the degradation threshold.

Aspect 11: The method of any of aspects 8 through 10, wherein the message is one of a system information message, a MAC-CE message, or a DCI message.

Aspect 12: The method of any of aspects 7 through 11, further comprising: transmitting a measurement report indicating measurements of the second set of reference signals; and receiving, via the first BWP, an indication to measure the first set of reference signals in accordance with the measurement report, wherein pausing the transmission of the one or more SDTs is in accordance with the indication.

Aspect 13: The method of any of aspects 7 through 12, wherein the first set of reference signals comprise one or more of CD-SSBs and the second set of reference signals comprise one or more of NCD-SSBs, tracking reference signals, or a combination thereof.

Aspect 14: The method of any of aspects 1 through 13, further comprising: transmitting a capability message indicating a capability of the UE to operate in the first BWP without receiving the first set of reference signals and one or more resources associated with the second BWP, wherein pausing the transmission of the one or more SDTs is in accordance with the capability of the UE.

Aspect 15: The method of any of aspects 1 through 14, wherein the UE is a reduced capability UE.

Aspect 16: A method for wireless communications at a UE, comprising: transmitting, in an inactive mode, one or more SDTs via a first BWP; receiving, in the inactive mode, a message comprising an indication of updated system information via the first BWP; and receiving, in the inactive mode, the updated system information in accordance with the message comprising the indication of the updated system information.

Aspect 17: The method of aspect 16, wherein the indication of the updated system information comprises the updated system information.

Aspect 18: The method of aspect 16, further comprising: receiving, via the message, an indication to terminate the transmission of the one or more SDTs; and monitoring a second BWP for the updated system information in accordance with the indication to terminate the transmission of the one or more SDTs.

Aspect 19: The method of aspect 18, wherein the second BWP comprises one or more combinations of a CD-SSB, a CORESET0, a common CORESET for a serving cell, or a combination thereof.

Aspect 20: The method of any of aspects 16 through 19, wherein the message is one of a RRC message, a MAC-CE, or a DCI message.

Aspect 21: A method for wireless communications at a network entity comprising: receiving, from a UE operating in an inactive mode, one or more SDTs via a first BWP; pausing the transmission of the one or more SDTs in the first BWP for a duration of time; transmitting a first set of reference signals via a second BWP while pausing the transmission of the one or more SDTs in the first BWP; and resuming the transmission of the one or more SDTs in the first BWP after transmitting the first set of reference signals.

Aspect 22: The method of aspect 21, further comprising: transmitting an indication of a length of a measurement gap for the UE to use in measuring the first set of reference signals and a periodicity of the measurement gap, wherein pausing the transmission of the one or more SDTs occurs during the measurement gap.

Aspect 23: The method of aspect 21, wherein pausing the transmission of the one or more SDTs is associated with a DRX of the UE.

Aspect 24: The method of any of aspects 21 through 23, wherein the duration of time is in accordance with a measurement time of the UE for measuring the first set of reference signals and a fixed value.

Aspect 25: The method of aspect 21, wherein pausing the transmission of the one or more SDTs occurs during a time frame that includes a transmission of the first set of reference signals and a paging occasion of the UE.

Aspect 26: The method of any of aspects 21 through 25, further comprising: transmitting, via the first BWP, an indication for the UE to measure the first set of reference signals, wherein pausing the transmission of the one or more SDTs is in accordance with the indication.

Aspect 27: The method of any of aspects 21 through 26, further comprising: transmitting a second set of reference signals in the first BWP, wherein the second set of reference signals are associated with a serving cell.

Aspect 28: The method of aspect 27, further comprising: transmitting a message indicating a degradation threshold, the degradation threshold being associated with the second set of reference signals.

Aspect 29: The method of aspect 28, wherein the message is one of a system information message, a MAC-CE, or a DCI message.

Aspect 30: The method of any of aspects 27 through 29, further comprising: receiving a measurement report indicating measurements of the second set of reference signals; and transmitting an indication to measure the first set of reference signals in accordance with the measurement report, wherein pausing the transmission of the one or more SDTs is in accordance with the indication.

Aspect 31: The method of any of aspects 27 through 30, wherein the first set of reference signals comprise one or more CD-SSBs and the second set of reference signals comprise one or more NCD-SSBs, one or more tracking reference signals, or a combination thereof.

Aspect 32: The method of any of aspects 21 through 31, further comprising: receiving a capability message indicating a capability of the UE to operate in the first BWP without receiving the first set of reference signals and one or more resources associated with the second BWP, wherein pausing the transmission of the one or more SDTs is in accordance with the capability of the UE.

Aspect 33: The method of any of aspects 21 through 32, wherein the UE is a reduced capability UE.

Aspect 34: A method for wireless communications at a network entity, comprising: receiving, from a UE operating in an inactive mode, one or more SDTs via a first BWP; transmitting a message comprising an indication of updated system information via the first BWP; and transmitting the updated system information in accordance with the message comprising the indication of the updated system information.

Aspect 35: The method of aspect 34, wherein the indication of the updated system information comprises the updated system information.

Aspect 36: The method of aspect 34, further comprising: transmitting, via the message, an indication to terminate the transmission of the one or more SDTs; and transmitting, via a second BWP, the updated system information in accordance with the indication to terminate the transmission of the one or more SDTs.

Aspect 37: The method of aspect 36, wherein the second BWP comprises one or more combinations of a CD-SSB, a CORESET0, a common CORESET for a serving cell, or a combination thereof.

Aspect 38: The method of any of aspects 34 through 37, wherein the message is one of a RRC message, a MAC-CE, or a DCI message.

Aspect 39: A UE, comprising one or more memories storing processor-executable code; and one or more processors coupled with the one or more memories and individually or collectively operable to execute the code to cause the UE to perform a method of any of aspects 1 through 15.

Aspect 40: A UE, comprising at least one means for performing a method of any of aspects 1 through 15.

Aspect 41: A non-transitory computer-readable medium storing code for wireless communications at a UE, the code comprising instructions executable by one or more processors to perform a method of any of aspects 1 through 15.

Aspect 42: A UE, comprising one or more memories storing processor-executable code; and one or more processors coupled with the one or more memories and individually or collectively operable to execute the code to cause the UE to perform a method of any of aspects 16 through 20.

Aspect 43: A UE, comprising at least one means for performing a method of any of aspects 16 through 20.

Aspect 44: A non-transitory computer-readable medium storing code for wireless communications at a UE, the code comprising instructions executable by one or more processors to perform a method of any of aspects 16 through 20.

Aspect 45: A network entity comprising one or more memories storing processor-executable code; one or more processors coupled with the one or more memories and individually or collectively operable to execute the code to cause the network entity to perform a method of any of aspects 21 through 33.

Aspect 46: An apparatus comprising at least one means for performing a method of any of aspects 21 through 33.

Aspect 47: A non-transitory computer-readable medium storing code the code comprising instructions executable by one or more processors to perform a method of any of aspects 21 through 33.

Aspect 48: A network entity, comprising one or more memories storing processor-executable code; one or more processors coupled with the one or more memories and individually or collectively operable to execute the code to cause the network entity to perform a method of any of aspects 34 through 38.

Aspect 49: A network entity, comprising at least one means for performing a method of any of aspects 34 through 38.

Aspect 50: A non-transitory computer-readable medium storing code for wireless communications at a network entity, the code comprising instructions executable by one or more processors to perform a method of any of aspects 34 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the user equipment to:

transmit, in an inactive mode, one or more small data transmissions via a first bandwidth part;

receive, in the inactive mode and via the first bandwidth part, a message comprising an indication that the UE is to receive updated system information that corresponds to a second bandwidth part; and receive, in the inactive mode and in accordance with the indication that the UE is to receive the updated system information, the updated system information.

2. The UE of claim 1, wherein the indication of the updated system information comprises the updated system information.

3. The UE of claim 1, wherein the one or more processors are further individually or collectively operable to execute the code to cause the UE to:

receive, via the message, an indication to terminate the transmission of the one or more small data transmissions; and monitor a second bandwidth part for the updated system information in accordance with the indication to terminate the transmission of the one or more small data transmissions.

4. The UE of claim 3, wherein the second bandwidth part comprises one or more combinations of a cell defining synchronization signal block, a core resource set indexed zero, a common core resource set for a serving cell, or a combination thereof.

5. The UE of claim 1, wherein the message is one of a radio resource control message, a medium access control-control element, or a downlink control information message.

6. A user equipment (UE), comprising:
- one or more memories storing processor-executable code; and
- one or more processors coupled with the one or more memories and individually or collectively operable to execute the code to cause the user equipment to:
  - transmit, in an inactive mode, one or more small data transmissions via a first bandwidth part configured for communications via the inactive mode;
  - pause the transmission of the one or more small data transmissions in the first bandwidth part to monitor a second bandwidth part for a first set of reference signals in the inactive mode, the second bandwidth part configured for cell defining communications;
  - measure the first set of reference signals in accordance with monitoring the second bandwidth part in the inactive mode; and
  - resume the transmission of the one or more small data transmissions in the first bandwidth part in the inactive mode
- measuring the first set of reference signals.

7. The UE of claim 6, wherein the one or more processors are further individually or collectively operable to execute the code to cause the UE to:
- receive an indication of a length of a measurement gap for measuring the first set of reference signals and a periodicity of the measurement gap, wherein pausing the transmission of the one or more small data transmissions occurs during the measurement gap.

8. The UE of claim 6, wherein pausing the transmission of the one or more small data transmissions is associated with a discontinuous reception cycle of the UE.

9. The UE of claim 6, wherein pausing the transmission of the one or more small data transmissions occurs for a duration of time, the duration of time being in accordance with a measurement time for measuring the first set of reference signals and a fixed value.

10. The UE of claim 6, wherein pausing the transmission of the one or more small data transmissions occurs during a time frame that includes a transmission of the first set of reference signals and a paging occasion of the UE.

11. The UE of claim 6, wherein the one or more processors are further individually or collectively operable to execute the code to cause the UE to:
- receive, via the first bandwidth part, an indication to measure the first set of reference signals, wherein pausing the transmission of the one or more small data transmissions is in accordance with the indication.

12. The UE of claim 6, wherein the one or more processors are further individually or collectively operable to execute the code to cause the UE to:
- measure a second set of reference signals in the first bandwidth part, wherein the second set of reference signals are associated with a serving cell.

13. The UE of claim 12, wherein the one or more processors are further individually or collectively operable to execute the code to cause the UE to:
- receive a message indicating a degradation threshold, the degradation threshold being associated with the second set of reference signals.

14. The UE of claim 13, wherein pausing the transmission of the one or more small data transmissions to monitor the second bandwidth part for the first set of reference signals in accordance with measurements of the second set of reference signals satisfying the degradation threshold.

15. The UE of claim 13, wherein the one or more processors are further individually or collectively operable to execute the code to cause the UE to:
- monitor for the first set of reference signals in the first bandwidth part in accordance with measurements of the second set of reference signals satisfying the degradation threshold.

16. The UE of claim 13, wherein the message is one of a system information message, a medium access control-control element message, or a downlink control information message.

17. The UE of claim 12, wherein the one or more processors are further individually or collectively operable to execute the code to cause the UE to:
- transmit a measurement report indicating measurements of the second set of reference signals; and
- receive, via the first bandwidth part, an indication to measure the first set of reference signals in accordance with the measurement report, wherein pausing the transmission of the one or more small data transmissions is in accordance with the indication.

18. The UE of claim 12, wherein the first set of reference signals comprise one or more of cell defining synchronization signal blocks and the second set of reference signals comprise one or more of non-cell defining synchronization signal blocks, tracking reference signals, or a combination thereof.

19. The UE of claim 6, wherein the one or more processors are further individually or collectively operable to execute the code to cause the UE to:
- transmit a capability message indicating a capability of the UE to operate in the first bandwidth part without receiving the first set of reference signals and one or more resources associated with the second bandwidth part, wherein pausing the transmission of the one or more small data transmissions is in accordance with the capability of the UE.

20. The UE of claim 6, wherein the UE is a reduced capability UE.

21. A method for wireless communications at a user equipment (UE), comprising:
- transmitting, in an inactive mode, one or more small data transmissions via a first bandwidth part;
- receiving, in the inactive mode and via the first bandwidth part, a message comprising an indication that the UE is to receive updated system information that corresponds to a second bandwidth part; and
- receiving, in the inactive mode and in accordance with the indication that the UE is to receive the updated system information, the updated system information.

22. The method of claim 21, wherein the indication of the updated system information comprises the updated system information.

23. The method of claim 21, further comprising:
- receiving, via the message, an indication to terminate the transmission of the one or more small data transmissions; and
- monitoring a second bandwidth part for the updated system information in accordance with the indication to terminate the transmission of the one or more small data transmissions.

24. The method of claim 23, wherein the second bandwidth part comprises one or more combinations of a cell defining synchronization signal block, a core resource set indexed zero, a common core resource set for a serving cell, or a combination thereof.

25. A method of wireless communication at a user equipment (UE), comprising:

transmitting, in an inactive mode, one or more small data transmissions via a first bandwidth part configured for communications via the inactive mode;

pausing the transmission of the one or more small data transmissions in the first bandwidth part to monitor a second bandwidth part for a first set of reference signals in the inactive mode, the second bandwidth part configured for cell defining communications;

measuring the first set of reference signals in accordance with monitoring the second bandwidth part in the inactive mode; and resuming the transmission of the one or more small data transmissions in the first bandwidth part in the inactive mode based at least in part on measuring the first set of reference signals.

26. The method of claim 25, further comprising:

receiving an indication of a length of a measurement gap for measuring the first set of reference signals and a periodicity of the measurement gap, wherein pausing the transmission of the one or more small data transmissions occurs during the measurement gap.

27. The method of claim 25, wherein pausing the transmission of the one or more small data transmissions is associated with a discontinuous reception cycle of the UE.

28. The method of claim 25, wherein pausing the transmission of the one or more small data transmissions occurs for a duration of time, the duration of time being in accordance with a measurement time for measuring the first set of reference signals and a fixed value.

29. The method of claim 25, wherein pausing the transmission of the one or more small data transmissions occurs during a time frame that includes a transmission of the first set of reference signals and a paging occasion of the UE.

30. The method of claim 25, further comprising:

receiving, via the first bandwidth part, an indication to measure the first set of reference signals, wherein pausing the transmission of the one or more small data transmissions is in accordance with the indication.

* * * * *